(12) United States Patent
Ukai et al.

(10) Patent No.: US 11,106,040 B2
(45) Date of Patent: Aug. 31, 2021

(54) VIDEO DISPLAY APPARATUS AND VIDEO DISPLAY SYSTEM

(71) Applicant: Hitachi-LG Data Storage, Inc., Tokyo (JP)

(72) Inventors: Ryuji Ukai, Tokyo (JP); Toshiteru Nakamura, Tokyo (JP); Takuma Kuno, Tokyo (JP); Satoshi Ouchi, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 131 days.

(21) Appl. No.: 16/656,780

(22) Filed: Oct. 18, 2019

(65) Prior Publication Data
US 2020/0201049 A1 Jun. 25, 2020

(30) Foreign Application Priority Data
Dec. 21, 2018 (JP) .............................. JP2018-240321

(51) Int. Cl.
G02B 27/01 (2006.01)
F21V 8/00 (2006.01)
G02B 27/09 (2006.01)
G02B 27/00 (2006.01)
G02B 27/14 (2006.01)

(52) U.S. Cl.
CPC ....... *G02B 27/0172* (2013.01); *G02B 6/0031* (2013.01); *G02B 27/0081* (2013.01); *G02B 27/0927* (2013.01); *G02B 27/145* (2013.01); *G02B 2027/014* (2013.01); *G02B 2027/0112* (2013.01); *G02B 2027/0123* (2013.01); *G02B 2027/0178* (2013.01)

(58) Field of Classification Search
CPC .............. G02B 27/0172; G02B 6/0031; G02B 27/0927; G02B 27/0081; G02B 27/145; G02B 2027/0123; G02B 2027/0178; G02B 2027/014; G02B 2027/0112; G02B 6/34; H04N 9/3141; H04N 13/344; H04N 13/324
USPC ........................................................ 359/633
See application file for complete search history.

(56) References Cited

U.S. PATENT DOCUMENTS

2003/0165017 A1 9/2003 Amitai
2017/0078645 A1* 3/2017 Aurigema ............... B63C 11/12
2017/0324944 A1* 11/2017 Nakajima ............ H04N 13/128

* cited by examiner

*Primary Examiner* — Mohammed A Hasan
(74) *Attorney, Agent, or Firm* — Mattingly & Malur, PC

(57) ABSTRACT

To provide a wide eye box and are capable of displaying a video having uniform luminance, it is provided a video display apparatus comprising: a video projection unit configured to project video light; a video light replication unit configured to replicate the video light; and a light guiding unit configured to transmit the video light through an inside of the light guiding unit, wherein the video light replication unit is configured to transmit the video light emitted from the video projection unit to the light guiding unit, wherein the light guiding unit is configured to transmit the video light that has entered through the inside to output the video light, and wherein the video light replication unit is configured to replicate the video light that has entered the video light replication unit so that a luminance distribution of the video light output from the light guiding unit is uniform.

15 Claims, 21 Drawing Sheets

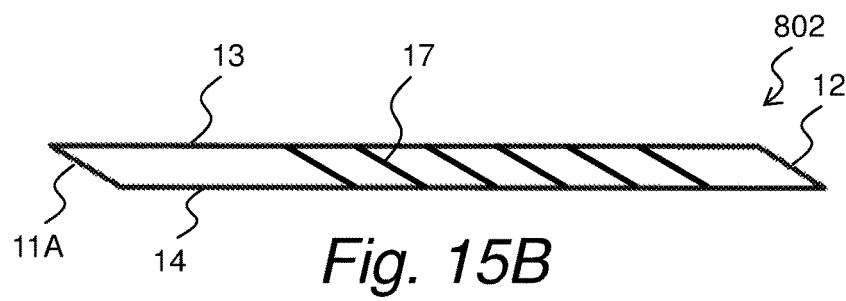
Fig. 15B
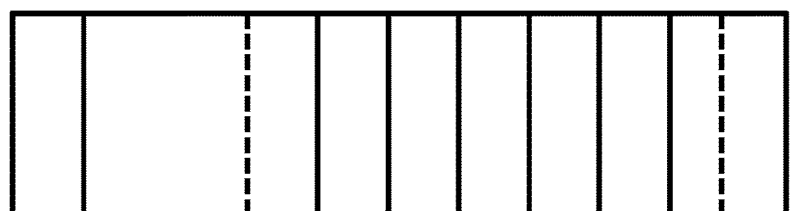
Fig. 15A
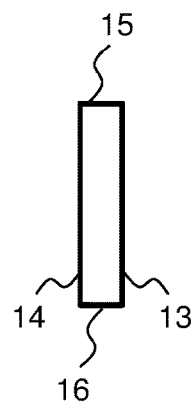
Fig. 15C
Fig. 16
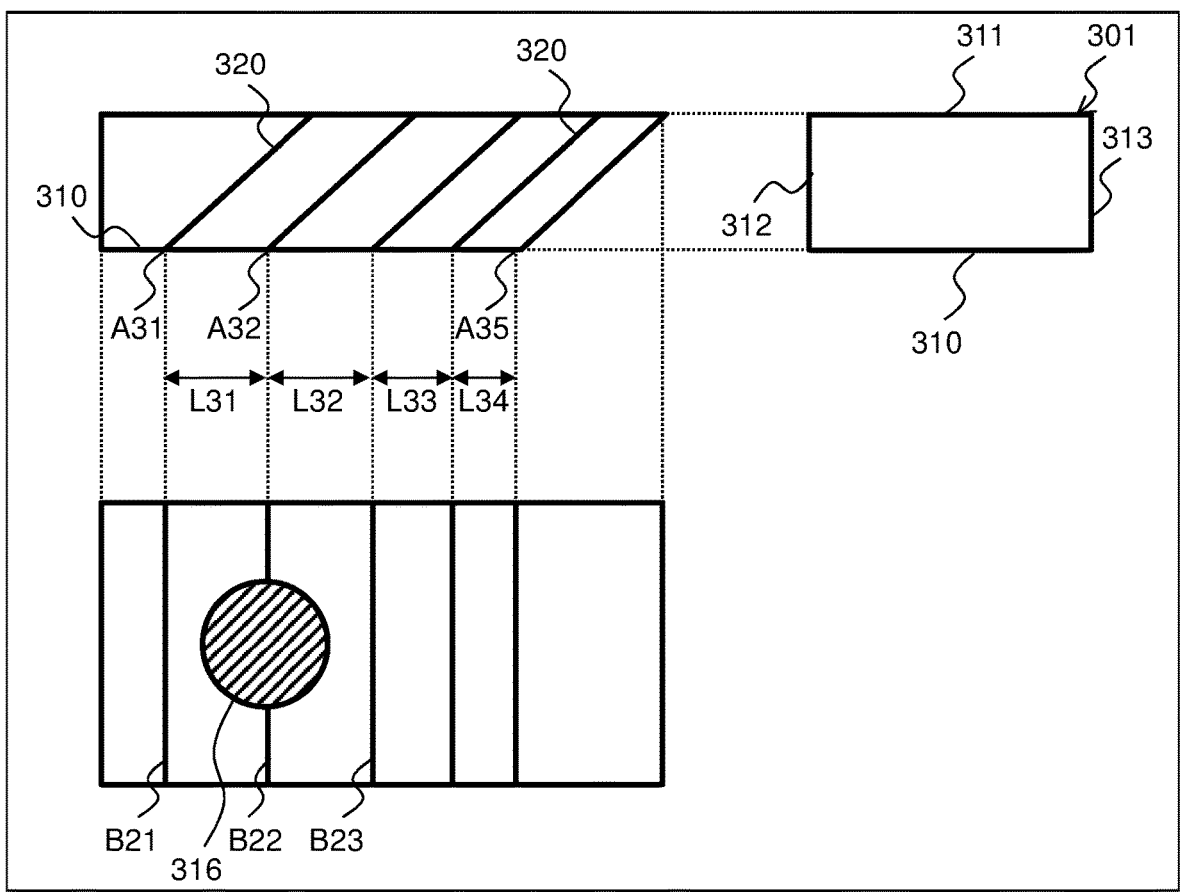

VIDEO DISPLAY APPARATUS AND VIDEO DISPLAY SYSTEM

CLAIM OF PRIORITY

The present application claims priority from Japanese patent application JP 2018-240321 filed on Dec. 21, 2018, the content of which is hereby incorporated by reference into this application.

BACKGROUND OF THE INVENTION

This invention relates to a video display apparatus and a video display system.

There is known a head-mounted display or other such video display system configured to present a video generated by a video generation apparatus to a user. For example, in US 2003/0165017 A1, there is disclosed an optical device including a light-transmitting substrate, optical means for coupling light into the substrate by total internal reflection, and a plurality of partially reflecting surfaces carried by the substrate, characterized in that the partially reflecting surfaces are parallel to each other and are not parallel to any of the edges of the substrate (see claim 1).

SUMMARY OF THE INVENTION

As illustrated in FIG. 17 of US 2003/0165017 A1, the optical device described in US 2003/0165017 A1 includes a beam splitter configured to split a ray, to thereby be able to increase the width of a light flux of light exiting the substrate to enlarge an eye box, which is an area in which the user can see a video even when the user's eyes move. However, a relationship between an interval between light beams obtained by splitting the light flux by the beam splitter and the diameter of the light flux exhibited before the splitting is not taken into consideration, and a part of a video reaching the user's eyes may become darker and thus luminance unevenness may occur in a displayed video.

This invention has been made in order to solve the above-mentioned problem, and an object of this invention is to provide a video display apparatus and a video display system, which provide a wide eye box and are capable of displaying a video having uniform luminance by employing a light guide plate.

The representative one of inventions disclosed in this application is outlined as follows. There is provided a video display apparatus comprising:
a video projection unit configured to project video light; a video light replication unit configured to replicate the video light; and a light guiding unit configured to transmit the video light through an inside of the light guiding unit, wherein the video light replication unit is configured to transmit the video light emitted from the video projection unit to the light guiding unit, wherein the light guiding unit is configured to transmit the video light that has entered through the inside to output the video light, and wherein the video light replication unit is configured to replicate the video light that has entered the video light replication unit so that a luminance distribution of the video light output from the light guiding unit is uniform.

According to at least one aspect of this invention, it is possible to provide the video display apparatus and the video display system, which provide a wide eye box and are capable of displaying a video having uniform luminance by employing the light guide plate. Problems, configurations, and effects other than those described above are clarified by the following description of embodiments of this invention.

BRIEF DESCRIPTION OF THE DRAWINGS

The present invention can be appreciated by the description which follows in conjunction with the following figures, wherein:

FIGS. 6A, 6B and 6C are diagrams for illustrating a light guide plate according to the first embodiment;

FIGS. 15A to 15C are diagrams for illustrating an example of a pupil expanding prisms according to the second embodiment;

FIG. 16 is a diagram for illustrating an example of a pupil expanding prisms according to a third embodiment;

DETAILED DESCRIPTION OF THE PREFERRED EMBODIMENTS

Now, embodiments of this invention are described below with reference to the accompanying drawings. The following description is given just for the purpose of describing an embodiment of this invention, and the scope of this invention is not limited by the following description. Accordingly, a person skilled in the art can adopt an embodiment in which each component or all components are substituted with the equivalents thereof, and such an embodiment is also included in the scope of this invention.

First Embodiment

Figure 1:
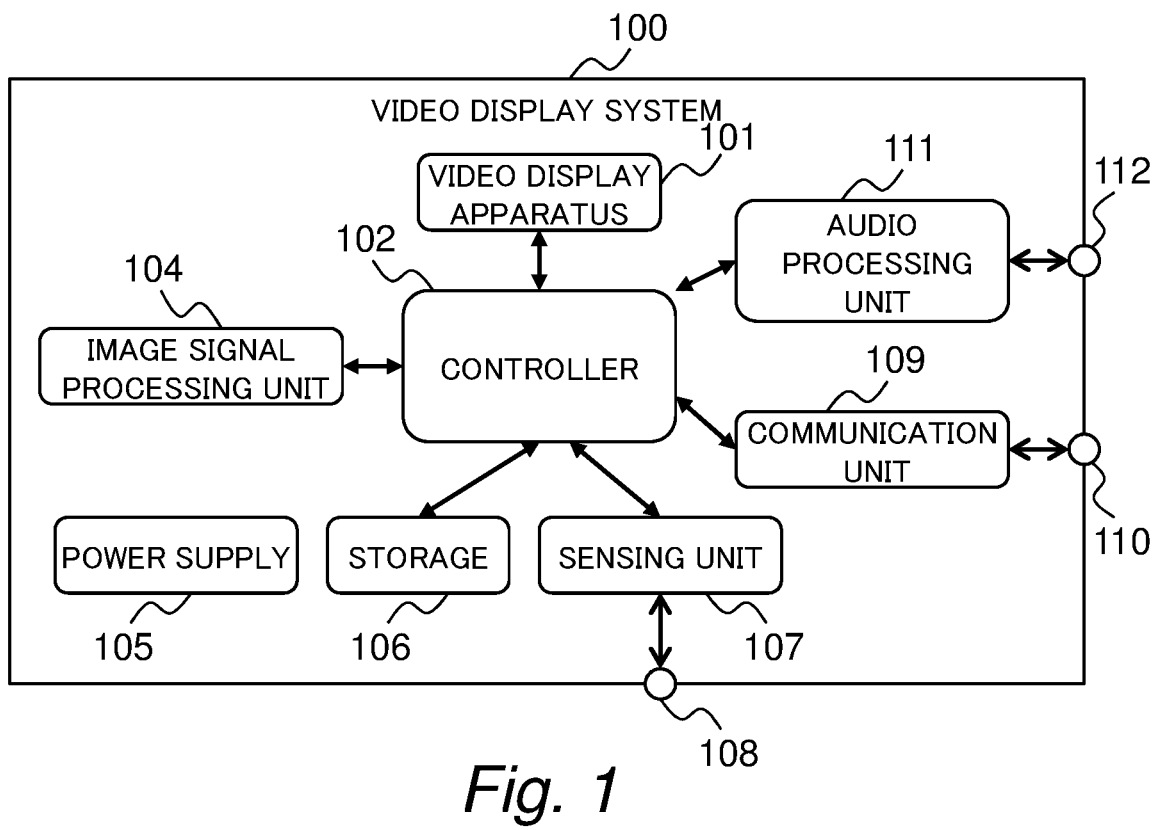
FIG. 1 is a diagram for illustrating an example of functional blocks of a video display system according to a first embodiment.

FIG. 1 is a diagram for illustrating an example of functional blocks of a video display system 100 according to a first embodiment of this invention.

The video display system 100 is a system having a function of displaying a video, for example, a head-mounted display or a head-up display. The video display system 100 includes a video display apparatus 101, a controller 102, an image signal processing module 104, a power supply unit 105, a storage medium 106, a sensing unit 107, a sensor input/output unit 108, a communication unit 109, a communication input/output unit 110, an audio processing unit 111, and an audio input/output unit 112.

The video display apparatus 101 is an apparatus configured to generate a video and display the video to a user of the video display system 100, which is described later in detail.

The controller 102 centrally controls the entire video display system 100. The controller 102 has the function implemented by, for example, a central processing unit (CPU). The image signal processing module 104 generates an image signal of the video to be displayed by the video display system 100. The power supply unit 105 is a power supply apparatus or a battery configured to supply electric power to the video display system 100.

The storage medium 106 stores information required for the processing performed by processing modules included in the video display system 100 and the video display apparatus 101 and generated information. The storage medium 106 is a storage apparatus, for example, a random access memory (RAM) or a flash memory, and functions as a storage area onto which a program and data are temporarily read. The storage medium 106 may include rewritable and readable storage media and storage media drives, for example, a hard disk drive (HDD), Compact Disc-Recordable (CD-R), a digital versatile disc-random access memory (DVD-RAM), and a solid state drive (SSD). The controller 102 performs processing by the CPU operated in accordance with the program read onto the storage medium 106. A part or all of the processing may be executed by another arithmetic unit (for example, a field programmable gate array (FPGA), an application specific integrated circuit (ASIC), or other such hardware).

The sensing unit 107 uses a sensor to detect a surrounding situation. The sensing unit 107 detects the situation through use of signals input to the sensor input/output unit 108 from sensors, for example, an illuminance sensor configured to detect ambient brightness, an inclination sensor and an acceleration sensor configured to detect, for example, the user's posture, orientation, and motion, an eye gaze sensor and a temperature sensor configured to detect the user's physical condition, a global navigation satellite system (GNSS) sensor configured to detect positional information on the user, a pressure-sensitive sensor, a capacitance sensor, and a bar code reader.

The communication unit 109 is coupled to a network (not shown) through the intermediation of the communication input/output unit 110. The communication unit 109 communicates to/from an information processing terminal (not shown) by short distance or long distance wireless communication or wired communication, for example, Bluetooth, Wi-Fi, ultra high frequency (UHF), or very high frequency (VHF). The audio processing unit 111 uses the audio input/output unit 112, for example, a microphone or an earphone, to receive input of sound or output sound.

It suffices that the video display system 100 according to the first embodiment has a function of displaying a video, and the video display system 100 is not required to include the sensing unit 107, the communication unit 109, and the audio processing unit 111.

Figure 2:
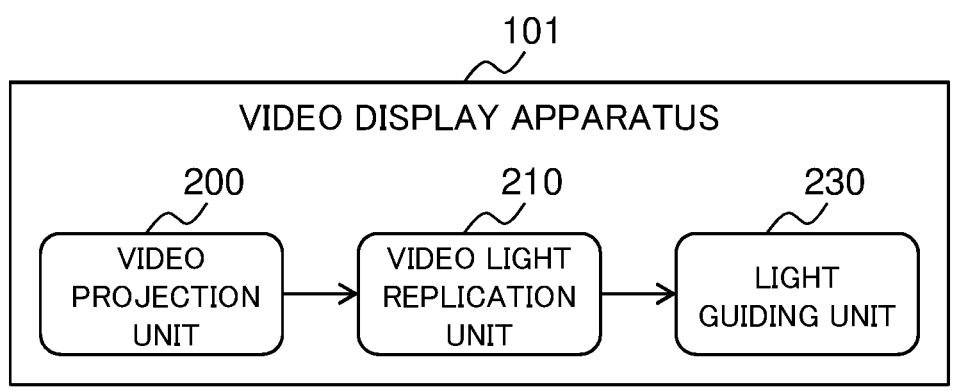
FIG. 2 is a diagram for illustrating an example of functional blocks of the video display apparatus according to the first embodiment.

FIG. 2 is a diagram for illustrating an example of functional blocks of the video display apparatus 101 according to the first embodiment.

The video display apparatus 101 includes the video projection unit 200, a video light replication unit 210, and a light guiding unit 230. The video projection unit 200 includes a video generation apparatus, and generates video light to be a video to be displayed by the video display apparatus 101 to output the video light to the video light replication unit 210. The video light replication unit 210 transmits the video light output from the video projection unit 200 to the light guiding unit 230. The light guiding unit 230 includes the light guide plate 220. The light guide plate 220 internally transmits the video light that has entered by total reflection caused by its inner surface to output the video light. While substantially maintaining the angle of view (size of the video expressed by an angle) of the video light that has entered, the video light replication unit 210 replicates the rays of the video light so as to equalize the output distribution of the video light output from the light guide plate 220, and outputs at least two video light beams.

Figure 23A:
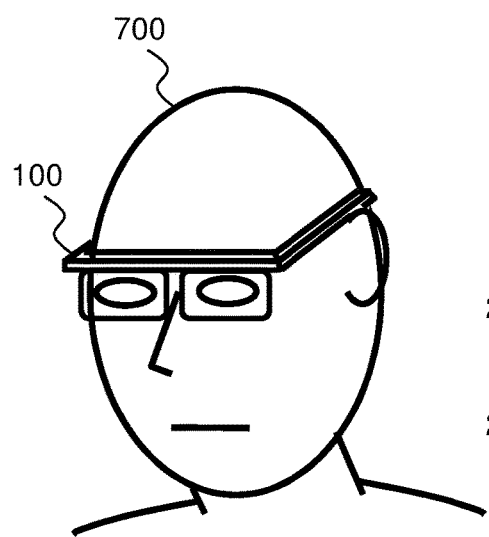
FIG. 23A is a diagram for illustrating the video display system including the video display apparatus according to the first embodiment.

FIG. 23A is a diagram for illustrating the video display system 100 including the video display apparatus 101 according to the first embodiment. The video display system 100 illustrated in FIG. 23A is a head-mounted display (referred to also as "smart glasses") that can be worn by a user 700 on his or her head and used.

Figure 23B:
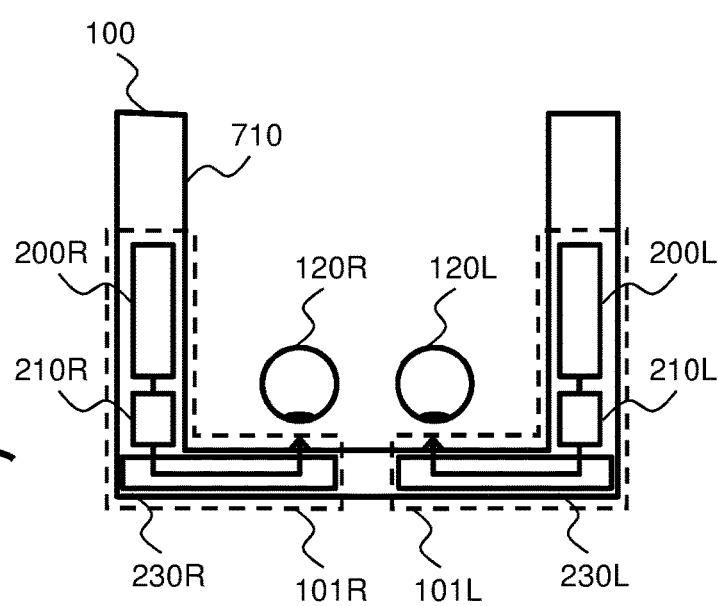
FIG. 23B is a diagram for illustrating an outline configuration of the video display system.

FIG. 23B is a diagram for illustrating an outline configuration of the video display system 100. The video display system 100 illustrated in FIG. 23B includes a holding unit 710, a video display apparatus 101R for a right eye, and a video display apparatus 101L for a left eye. The video display apparatus 101R for the right eye includes a video projection unit 200R for the right eye, a video light replication unit 210R for the right eye, and a light guiding unit 230R for the right eye, and the video display apparatus 101L for the left eye includes a video projection unit 200L for the left eye, a video light replication unit 210L for the left eye, and a light guiding unit 230L for the left eye. The holding unit 710 is a housing for holding all or a part of components of the video display apparatus 101R for the right eye and the video display apparatus 101L for the left eye. The user 700 can visually recognize a video displayed by the video display apparatus 101 by wearing the holding unit 710 on the head and perceiving videos displayed by the video display apparatus 101R for the right eye and the video display apparatus 101L for the left eye by at least one of user's eyes 120R (right eye) and 120L (left eye).

Figure 3A:
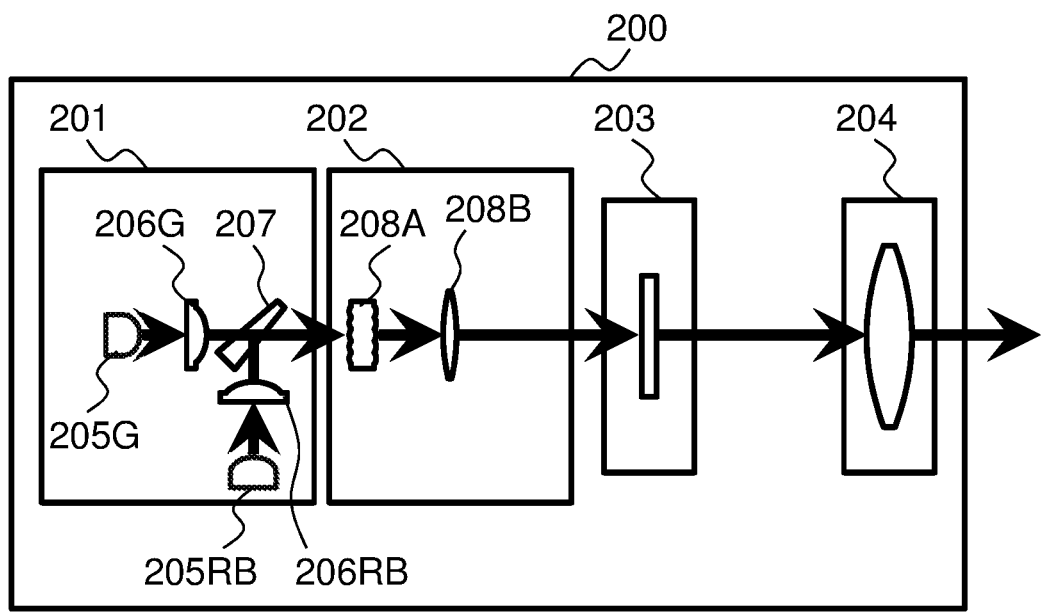
FIG. 3A is a diagram for illustrating an example of the video projection unit according to the first embodiment.

FIG. 3A is a diagram for illustrating an example of the video projection unit 200. The video projection unit 200 includes a light source unit 201, an illumination optical unit 202, a panel unit 203, and a projection optical unit 204.

The light source unit 201 emits light for the video display apparatus 101 to output a video. The light emitted from the light source unit 201 passes through the illumination optical unit 202 to enter the panel unit 203. The illumination optical unit 202 is an optical system for illuminating the panel unit 203 with the light from the light source unit 201. The panel unit 203 modulates the light that has entered from the light source unit 201 based on a video signal to generate a video. The light exiting the panel unit 203 enters the projection optical unit 204. The projection optical unit 204 projects the light that has entered from the panel unit 203. The video projection unit 200 outputs the light projected by the projection optical unit 204 as video light.

The light source unit 201 includes, for example, a light source 205G configured to output green light, a light source 205RB configured to output red light and the blue light, condenser lenses 206G and 206RB, and a dichroic mirror 207. The light beams emitted from the light sources 205G and 205RB are changed to substantially collimated beams by the condenser lenses 206G and 206RB, respectively, and are multiplexed by the dichroic mirror 207. The dichroic mirror 207 is configured such that the optical axes of the exiting red, green, and blue light beams are substantially parallel to each other.

Figure 3B:
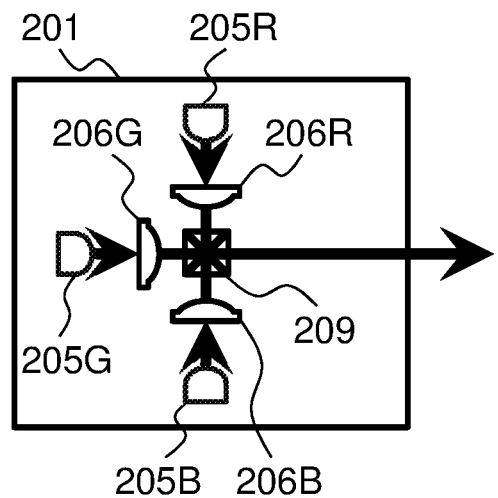
FIG. 3B is a diagram for illustrating another configuration example of the light source unit according to the first embodiment.

FIG. 3B is a diagram for illustrating another configuration example of the light source unit 201. The light source unit 201 illustrated in FIG. 3B includes a light source 205R configured to output red light, a light source 205G configured to output green light, a light source 205B configured to output blue light, condenser lenses 206R, 206G, and 206B, and a cross prism 209. The light beams emitted from the respective light sources 205R, 205G, and 205B are changed to substantially collimated beams by the condenser lenses 206R, 206G, and 206B, respectively, and are multiplexed by the cross prism 209.

As another example of the another light source unit 201, a light source configured to output red light, green light, and blue light may be used. In this case, it is possible to multiplex the red light, green light, and blue light through use of, for example, a light tunnel or an integrator.

The illumination optical unit 202 includes, for example, a microlens array 208A and a lens 208B. The light that has entered the illumination optical unit 202 is transmitted through the microlens array 208A and the lens 208B. The microlens array 208A has entrance cells each configured such that the exiting light is imaged on a panel that forms the panel unit 203. This allows the panel to be illuminated with a substantially uniform illuminance distribution.

As the panel that forms the panel unit 203, for example, a transmissive or reflective liquid crystal panel or an element in which micro-electro mechanical systems (MEMS) with a mirror are arranged in array can be used.

The projection optical unit 204 includes, for example, a projection lens formed of one or a plurality of lenses or curved mirrors.

The video projection unit 200 can generate video light by synchronously driving the light source unit 201 and the panel unit 203. For example, image data on the video to be displayed is formed of data for red, data for green, and data for blue, and a full-color video can be displayed by a field-sequential system by turning on only a red light source during a period in which the data for red is being displayed on the panel, turning on only a green light source during a period in which the data for green is being displayed on the panel, and turning on only a blue light source during a period in which the data for blue is being displayed on the panel. It is also possible to increase the brightness of the video to be displayed by the video display apparatus 101 by turning on at least one of the green or blue light source during a period in which the data for red is being displayed on the panel, turning on at least one of the red or blue light source during a period in which the data for green is being displayed on the panel, and turning on at least one of the red or green light source during a period in which the data for blue is being displayed on the panel.

In addition, the video display apparatus 101 may change the brightness of the video to be displayed based on the ambient brightness detected by the illuminance sensor, which is input to the sensor input/output unit 108.

The light source unit 201 described above includes the red, green, and blue light sources, but the first embodiment is not limited thereto. The light sources may emit light of colors other than red, green, or blue. This allows an increase in a color reproduction range that can be displayed by the video projection unit 200. The light source may emit light of two kinds of colors or emit light of one kind of color with limitations imposed on the color reproduction range that can be displayed. This allows the video projection unit 200 to be manufactured with a compact size and a low cost.

Figure 4A:
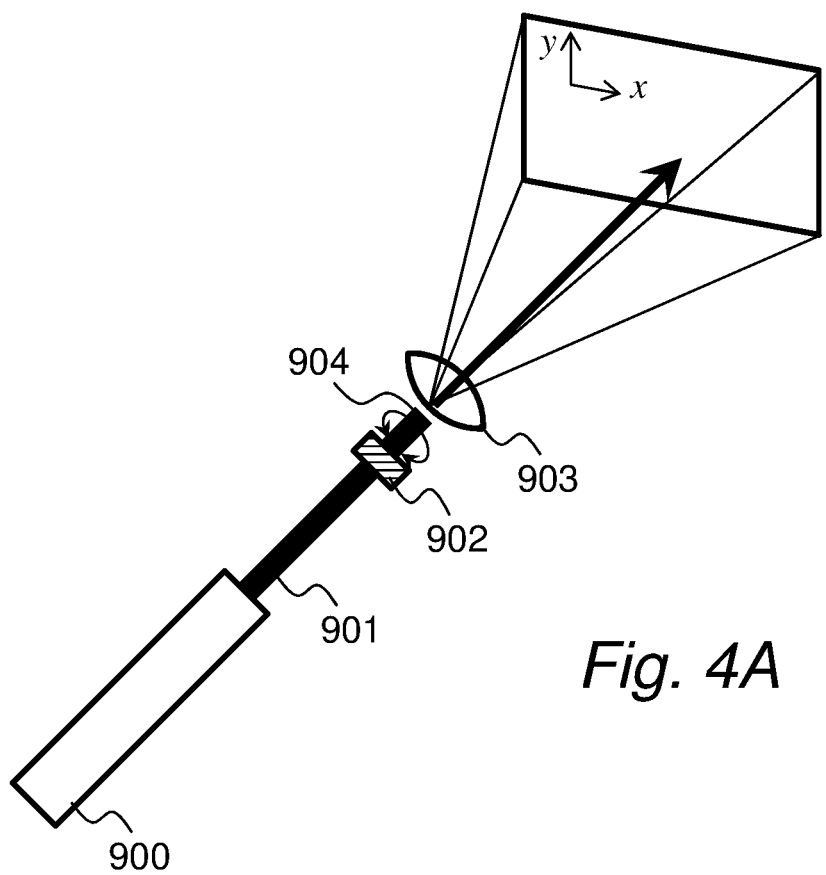
FIGS. 4A and 4B are diagrams for illustrating a configuration example of a fiber scanning projector according to the first embodiment.

FIG. 4A is a diagram for illustrating a configuration example of a fiber scanning projector, which is another example of the video projection unit 200. The fiber scanning projector includes a light source unit 900, an optical fiber 901, a fiber scanning element 902, and a collimator lens 903. The light source unit 900 outputs, for example, laser light. The light output from the light source unit 900 is transmitted inside the optical fiber 901 to exit through an end surface 904 of the optical fiber 901. The light that has exited the optical fiber 901 is collimated by the collimator lens 903 to become light having directivity. The fiber scanning element 902 is attached to the optical fiber 901, and moves the end surface 904 to scan the light that has exited the optical fiber 901. By synchronizing the intensity of the light output from the light source unit 900 and the movement of the end surface 904 caused by the fiber scanning element 902 with the video signal, the fiber scanning projector can project the video.

Figure 4B:
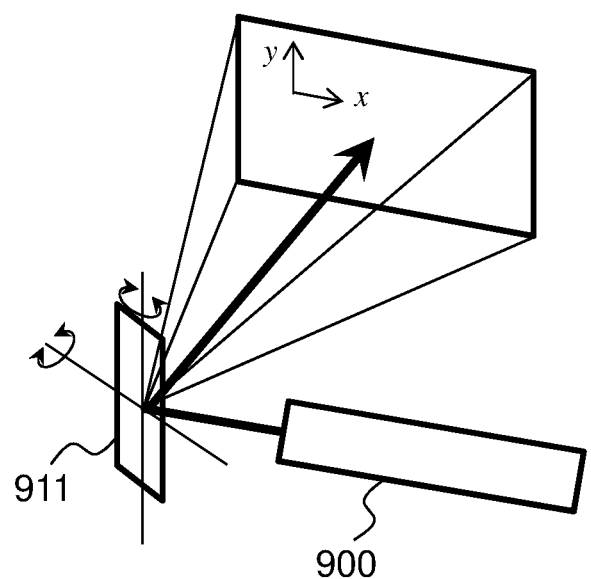

FIG. 4B is a diagram for illustrating a configuration example of an optical scanning projector using a scanning mirror, which is another example of the video projection unit 200. The optical scanning projector using a scanning mirror includes the light source unit 900 and a scanning element 911. The scanning element 911 includes a mirror. The directional light output from the light source unit 900 enters the mirror of the scanning element 911 to be reflected. The scanning element 911 moves the mirror to scan the reflected light. By synchronizing the intensity of the light output from the light source unit 900 and the movement of the scanning element 911 with the video signal, the optical scanning projector can project the video.

Figure 5:
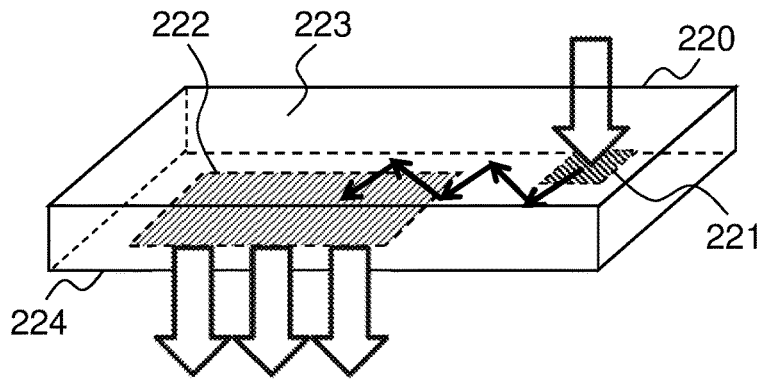
FIG. 5 is a conceptual diagram of the light guide plate according to the first embodiment.

FIG. 5 is a conceptual diagram of the light guide plate 220.

The light guide plate 220 includes an optical input portion 221 and an optical output portion 222. The video light that has exited the video light replication unit 210 enters the inside of the light guide plate 220 from the optical input portion 221 of the light guide plate 220, and is transmitted through the inside of the light guide plate 220 by total reflection caused by inner reflection surfaces 223 and 224. The light guide plate 220 has a function of causing light to exit through the optical output portion 222 having a range wider than that of the optical input portion 221, that is, a function of expending a pupil, and replicates the video light that has entered the light guide plate 220 from the optical input portion 221 into a plurality of video light beams to output the video light beams from the optical output portion 222. A part of the video light output from the optical output portion 222 of the light guide plate 220 enters the user's eyes 120. The user can visually recognize the video displayed by the video display apparatus 101 by perceiving the light that has entered the eyes 120.

FIG. 6A is a diagram for illustrating a light guide plate 801, which is an example of the light guide plate 220. FIG. 7A, FIG. 7B and FIG. 7C are a front view, a plan view, and a side view, respectively, of the light guide plate 801 illustrated in FIG. 6A. The light guide plate 801 is formed of a hexahedron, and includes an entrance surface 11, a terminal surface 12, a first inner reflection surface 13, a second inner reflection surface 14, an upper surface 15, and a lower surface 16. The first inner reflection surface 13 and the second inner reflection surface 14 are substantially parallel to each other.

The light guide plate 801 illustrated in FIG. 6A includes N beam splitter surfaces 17 in the inside. In this case, N represents an integer equal to or larger than 1. The N beam splitter surfaces 17 are substantially parallel to each other.

The entrance surface 11 is a surface through which light enters the light guide plate 801, and functions as the optical input portion 221. The first inner reflection surface 13 and the second inner reflection surface 14 guide the light that has entered the light guide plate 801 from the entrance surface 11 through the inside of the light guide plate 801 by total reflection.

The light totally reflected by the first inner reflection surface 13 and the second inner reflection surface 14 and propagated through the inside of the light guide plate 1 enters the N beam splitter surfaces 17. The beam splitter surface 17 reflects a part of the light that has entered and perpendicularly transmits the part of the light through the second inner reflection surface 14, to thereby cause the part of the light to exit to the outside of the light guide plate 801, while transmitting the other part of the light. The second inner reflection surface 14 functions as the optical output portion 222.

The light guide plate 801 may be configured such that the N beam splitter surfaces 17 and the terminal surface 12 are substantially parallel to each other. This can reduce the manufacturing processes for the light guide plate 801 and their cost.

The light guide plate 801 may also be configured such that an angle formed by the entrance surface 11 and the first inner reflection surface 13 is approximately twice as large as an angle formed by the N beam splitter surfaces 17 and the first inner reflection surface 13. This can cause the angle of view (size of the video expressed by an angle) of the video light exiting the second inner reflection surface 14 to be substantially the same as the angle of view (size of the video expressed by an angle) of the video light entering the light guide plate 801 from the entrance surface 11.

FIG. 6B is a diagram for illustrating another configuration example of the light guide plate 220. A light guide plate 811 illustrated in FIG. 6B includes a plurality of diffraction regions 812 and 813. The diffraction region 812 has a diffraction structure in a direction substantially parallel to the z-axis. The diffraction region 813 has diffraction structures in two directions of approximately +60 degrees and approximately −60 degrees counterclockwise with respect to the x-axis in the x-z plane. Pitches of the diffraction structure of the diffraction region 812 and pitches of the diffraction structure of the diffraction region 813 in each of the two directions are all substantially equal to each other.

The video light that has entered the diffraction region 812 serving as the optical input portion 221 is diffracted to be taken into the inside of the light guide plate 811, and is guided through the inside of the light guide plate 811 while being totally reflected, to thereby reach the diffraction region 813 corresponding to the optical output portion 222. The diffraction region 813 has a diffraction structure in two directions, but in the process of being totally reflected and guided through the inside of the light guide plate 811, the video light is diffracted one time by each of the diffraction structures of the diffraction region 813 in the two directions to exit the light guide plate 811.

Figure 6C:
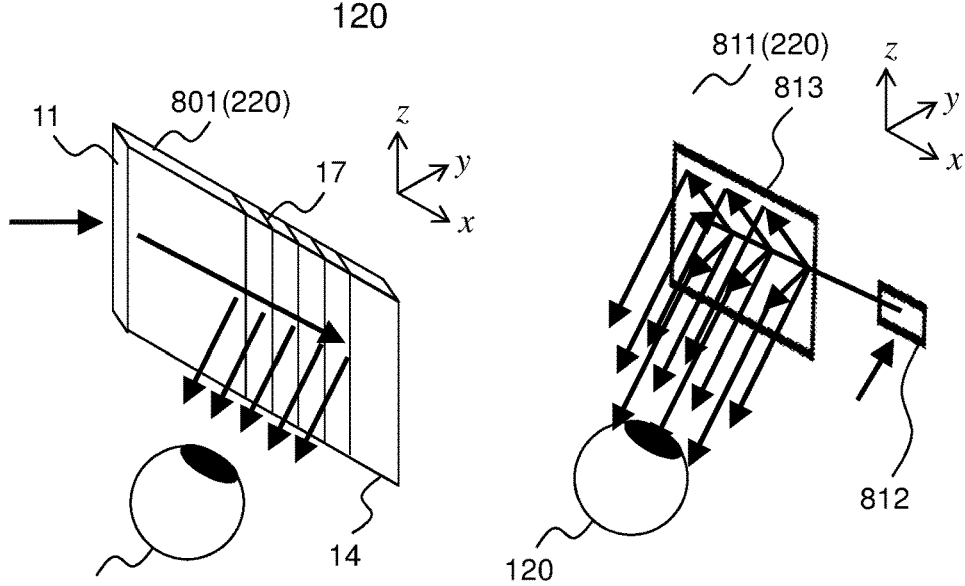
Figure 6C:
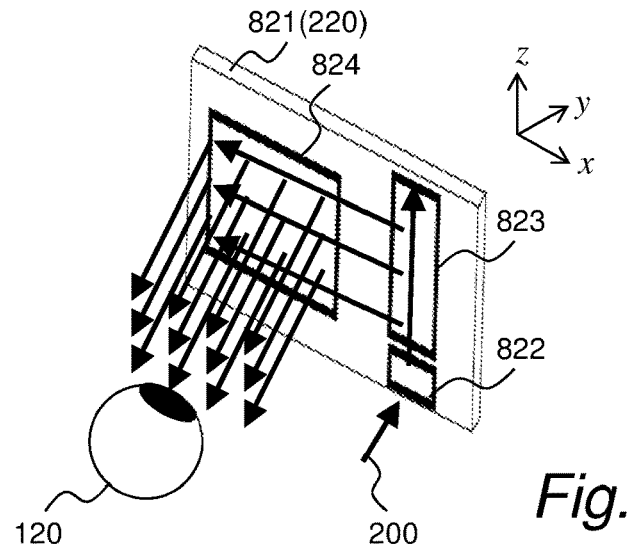
Figure 7B:
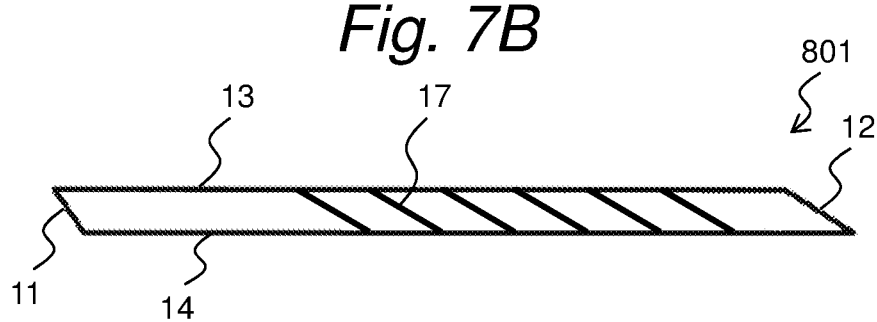
FIGS. 7A to 7C are diagrams for illustrating a light guide plate according to the first embodiment.
Figure 7A:
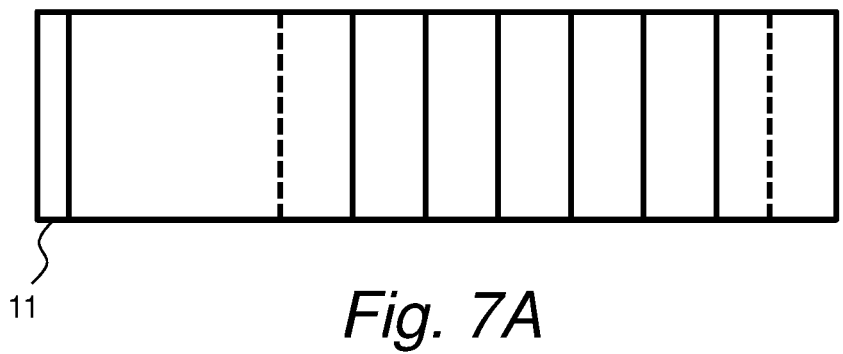
Figure 7C:
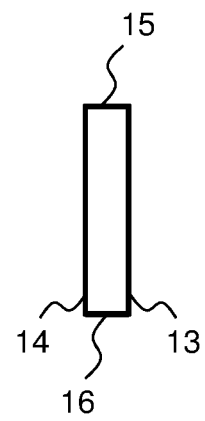

FIG. 6C is a diagram for illustrating another example of the light guide plate 220. A light guide plate 821 illustrated in FIG. 6C includes a plurality of diffraction regions 822, 823, and 824. The diffraction region 822 has a diffraction structure in a direction substantially parallel to the x-axis. The diffraction region 823 has a diffraction structure in a direction substantially parallel to the straight line of z=−x in the x-z plane. The diffraction region 824 has a diffraction structure in a direction substantially parallel to the z-axis. A pitch of the diffraction structure of the diffraction region 822 and a pitch of the diffraction structure of the diffraction region 824 are substantially equal to each other, and a pitch of the diffraction structure of the diffraction region 823 has a value substantially equal to a value obtained by dividing the pitch of the diffraction structure of the diffraction region 822 by the square root of 2.

The video light that has entered the diffraction region 822 serving as the optical input portion 221 is diffracted to be taken into the inside of a light guide plate 821, and is totally reflected and guided through the inside of the light guide plate 821. In the process of being totally reflected and guided, a part of the video light is diffracted to change its traveling direction each time the video light reaches the diffraction region 823, and is totally reflected and guided through the inside of the light guide plate 821. Further, another part of the video light is diffracted each time the part of the video light reaches the diffraction region 824 corresponding to the optical output portion 222, and the ray is replicated to exit the light guide plate 821.

Figure 8:
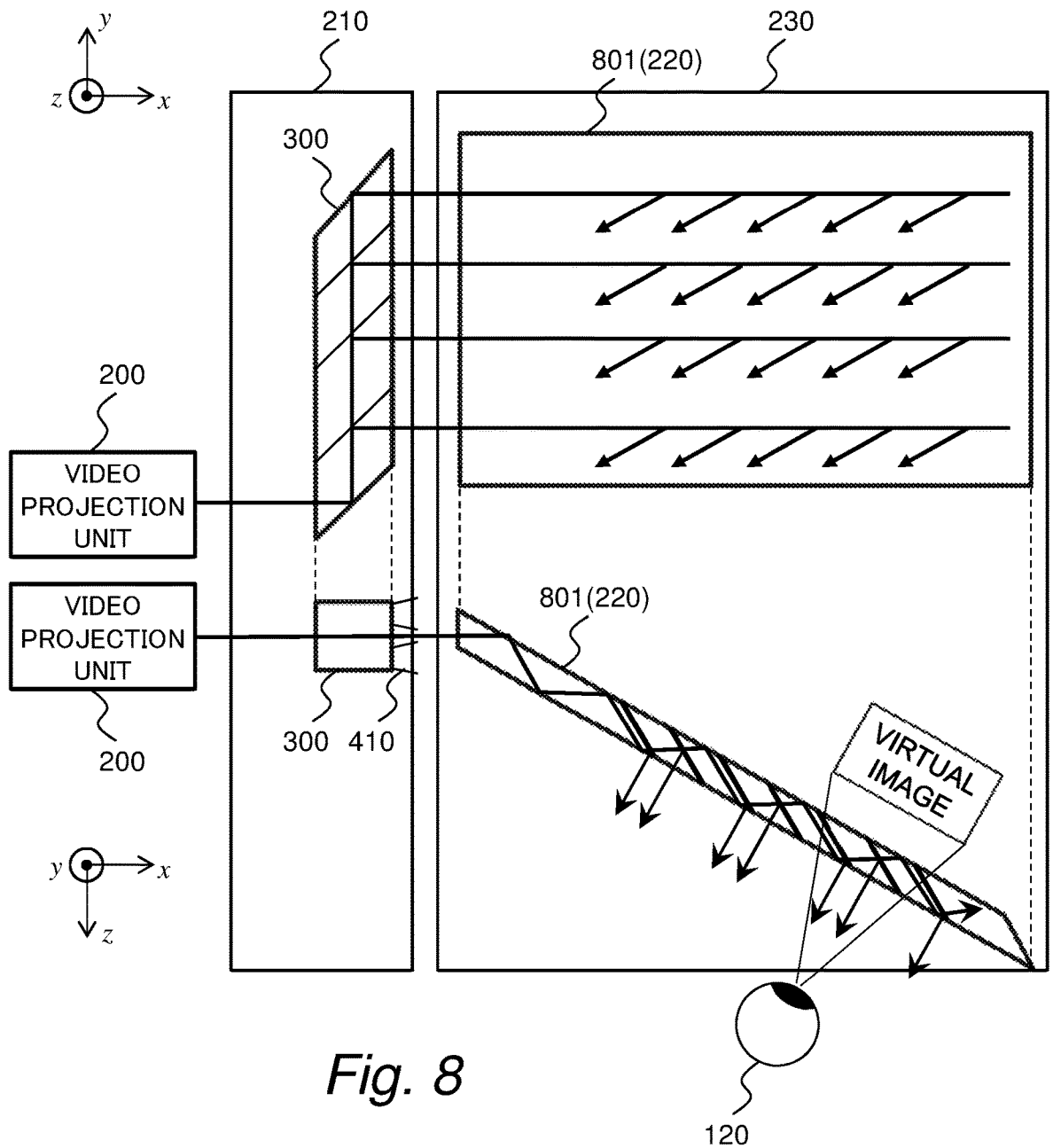
FIG. 8 is a diagram for illustrating an example of the video display apparatus according to the first embodiment.

FIG. 8 is a diagram for illustrating an example of the video display apparatus 101 according to the first embodiment, in which a view from the front surface side of the light guide plate 801 is illustrated on the upper side and a view from the top side of the light guide plate 801 is illustrated on the lower side. The video light replication unit 210 includes a pupil expanding prism 300, and includes the light guide plate 801 illustrated in FIG. 6A as the light guide plate 220.

Figure 9A:
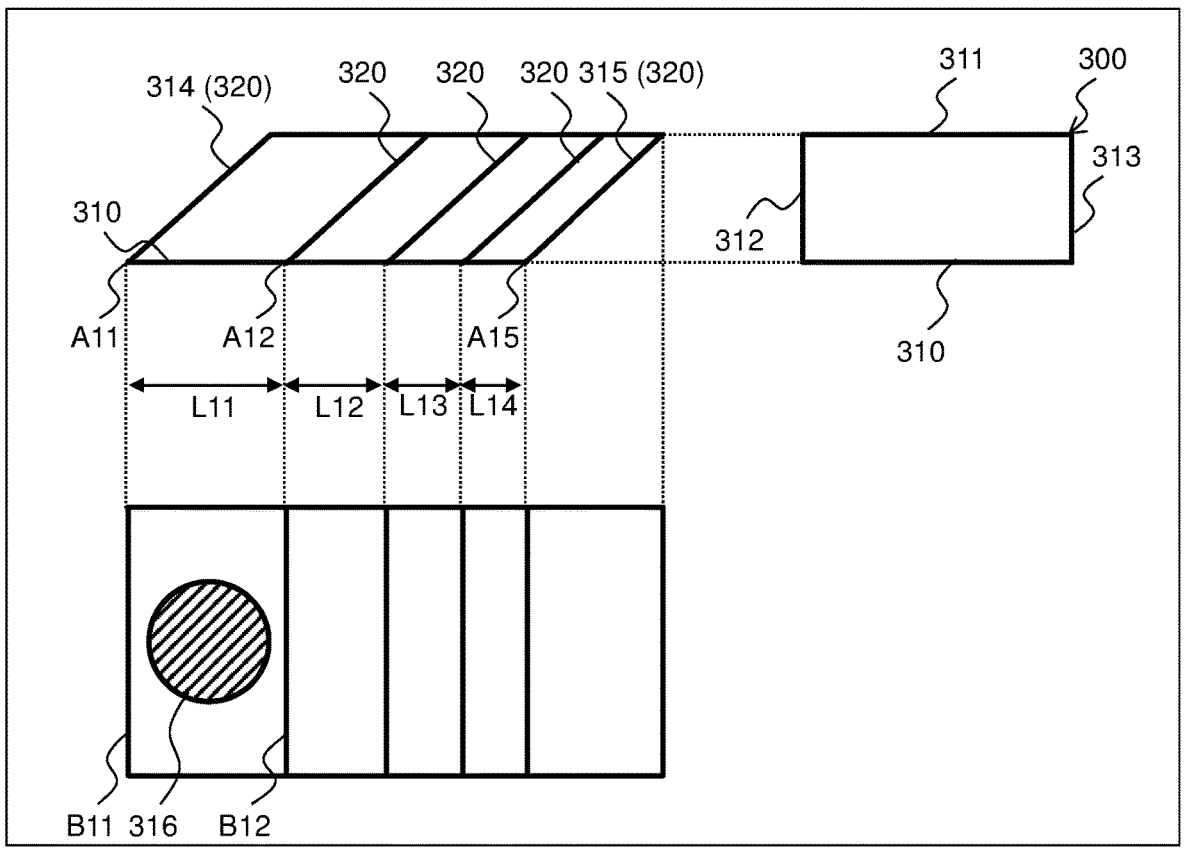
FIGS. 9A to 9D are diagrams for illustrating an example of the pupil expanding prism according to the first embodiment.

FIG. 9A shows a front view, a plan view, and a side view, respectively, of the pupil expanding prism 300. The outer shape of the pupil expanding prism 300 is a rectangle in the front view, a parallelogram in the plan view, and a rectangle in the side view. Specifically, the outer shape of the pupil expanding prism 300 has a parallelepiped shape in which two opposing surfaces are parallelograms and the other four surfaces are rectangles. Among rectangles, a graphic form whose four sides all have the same length is particularly referred to as "square", but in this invention, the square is described as one of the forms of rectangles.

The pupil expanding prism 300 having a parallelepiped shape has six surfaces, that is, an entrance surface 310, an exit surface 311, side surfaces 312 and 313, and reflecting side surfaces 314 and 315. The entrance surface 310 and the exit surface 311 are substantially parallel to each other, the side surface 312 and the side surface 313 are substantially parallel to each other, and the reflecting side surface 314 and the reflecting side surface 315 are substantially parallel to each other.

The pupil expanding prism 300 includes N partially reflecting surfaces 320. In this case, N represents an integer equal to or larger than 2. The N partially reflecting surfaces 320 are substantially parallel to each other. Two of the N partially reflecting surfaces 320 are the reflecting side surfaces 314 and 315. For example, as illustrated in FIG. 9A, one or more (three in FIG. 9A) intermediate partially reflecting surface 320 may be provided, to thereby provide at least three partially reflecting surfaces including the first partially reflecting surface (reflecting side surface) 314 and the N-th partially reflecting surface (reflecting side surface) 315. As illustrated in FIG. 9D, instead of being provided with the intermediate partially reflecting surface 320, the pupil expanding prism 300 may be formed of two partially reflecting surfaces, that is, the first partially reflecting surface (reflecting side surface) 314 and the N-th partially reflecting surface (reflecting side surface) 315, by setting the reflectance of the first partially reflecting surface (reflecting side surface) 314 to lower than 100 percent.

The video light emitted from the video projection unit 200 enters the pupil expanding prism 300 from the entrance surface 310. The pupil expanding prism 300 is made of a medium having high transparency, and the light that has entered the entrance surface 310 is propagated through the inside of the pupil expanding prism 300. The material of the pupil expanding prism 300 may be, for example, glass or resin. In order to prevent duplicate videos from being displayed, the material of the pupil expanding prism 300 may have no or little birefringence.

The video light that has entered the pupil expanding prism 300 is propagated through the inside of the pupil expanding prism 300. The pupil expanding prism 300 may be configured such that the principal ray of the video light emitted from the video projection unit 200 is guided without being totally reflected between each of the pairs of surfaces substantially parallel to each other among the six surfaces of the pupil expanding prism 300. When the principal ray of the video light is guided by being totally reflected between each of the pairs of surfaces substantially parallel to each other, the video may be inverted, or the resolution of the video may be lowered due to the imperfection in the flatness of the surfaces. With this configuration, it is possible to prevent the resolution of the video from being lowered.

The light that has entered the pupil expanding prism 300 from the entrance surface 310 first enters the reflecting side surface 314. As described above, the reflecting side surface 314 is one of the N partially reflecting surfaces 320, and is hereinafter referred to as "first partially reflecting surface 314". The partially reflecting surfaces 320 other than the first partially reflecting surface 314 are referred to as "second partially reflecting surface 320" to "N-th partially reflecting surface 315" in ascending order of the distance from the first partially reflecting surface 314. The N-th partially reflecting surface 315 is the same as the reflecting side surface 315.

The partially reflecting surface 320 is configured to reflect at least a part of the light. In particular, the second partially reflecting surface 320 to the N-th partially reflecting surface 315 reflect at least a part of the light, and transmit at least a part of the light. Preferably, the first partially reflecting surface 314 and the N-th partially reflecting surface 315 may have a reflectance of approximately 100 percent. With this configuration, it is possible to enhance light utilization efficiency.

At least a part of the light that has entered the first partially reflecting surface 314 is reflected by the first partially reflecting surface 314, and is propagated through the inside of the pupil expanding prism 300. The light reflected by the first partially reflecting surface 314 enters the second partially reflecting surface 320. Assuming that k is an integer equal to or larger than 2 and smaller than N, a part of the light that has entered the k-th partially reflecting surface is transmitted through the k-th partially reflecting surface to enter the (k+1)th partially reflecting surface. Meanwhile, a part of the light that has entered the k-th partially reflecting surface is reflected by the k-th partially reflecting surface to exit the exit surface 311. Specifically, assuming that k is an integer equal to or larger than 1 and smaller than N, the video light entering the (k+1)th partially reflecting surface has been reflected by or transmitted through the k-th partially reflecting surface before entering the (k+1)th partially reflecting surface. In particular, in the front view shown in FIG. 9A, entering light 316 enters the pupil expanding prism 300 into a portion between an intersection line B11, which is an intersection line between the first partially reflecting surface 314 and the entrance surface 310, and an intersection line B12, which is an intersection line between the second partially reflecting surface and the entrance surface 310. In the video light replication unit 210, the pupil expanding prism 300 replicates the entering light 316 into at least two light beams, and the replicated video light beams are output from the exit surface 311 as a plurality of video light beams.

In the plan view of the pupil expanding prism 300 shown in FIG. 9A, assuming that k is an integer equal to or larger than 1 and equal to or smaller than N, an intersection point between the k-th partially reflecting surface 320 and the entrance surface 310 is set as a point A1k. In addition, assuming that k is an integer equal to or larger than 1 and equal to or smaller than N−1, a distance (namely, distance between the point A1k and a point A1(k+1)) between the k-th partially reflecting surface and the (k+1)th partially reflecting surface is defined as L1k. Of the optical elements included in the video projection unit 200, an optical element that reflects, transmits, or refracts the video light immediately before the video light is emitted from the video projection unit 200 is referred to as "final optical element".

At this time, the video projection unit 200 and the video light replication unit 210 are configured such that at least one of the distances L1k between the partially reflecting surfaces 320 is smaller than or substantially equal to the outer size of the final optical element. Preferably, the video projection unit 200 and the video light replication unit 210 may be configured such that, assuming that k is an integer equal to or larger than 1 and equal to or smaller than N−1, all the distances L1k are smaller than or substantially equal to the outer size of the final optical element. With this configuration, the light flux of the plurality of video light beams that have exited the video light replication unit 210 is larger than the light flux of the video light that has entered the video light replication unit 210. In addition, at least parts of the plurality of video light beams reflected by the partially reflecting surface 320 to exit the video light replication unit 210 are overlapped with each other.

The plurality of video light beams having the light flux increased with at least parts thereof being overlapped with each other enter the light guide plate 220 to be guided through the inside of the light guide plate 220 by total reflection, and then exit the optical output portion 222 of the light guide plate 220. The user takes a part of the light that has exited the light guide plate 220 into the user's eyes 120, and visually recognizes the video by perceiving the video light. At this time, when there is a gap between the video light beams exiting the video light replication unit 210, there is also a gap between the video light beams exiting through the optical output portion 222 of the light guide plate 220, and when the user sees the video near the gap, the user fails to see at least a part of the video due to the gap. Therefore, the user visually recognizes a video in which a part thereof is considerably dark. However, according to the first embodiment, at least parts of the plurality of video light beams that have exited the video light replication unit 210 are overlapped with each other, and hence a part of the video to be visually recognized by the user is prevented from becoming considerably dark, which allows the user to visually recognize the video having substantially uniform luminance. The term "uniform" means that, for example, in the luminance distribution of the video to be visually recognized by the user, a ratio of the local minimum value to the local maximum value of adjacent luminances is equal to or larger than ½, and within this range, the user can recognize the luminance of an image as uniform without a sense of discomfort.

In addition, the video light replication unit 210 replicates the video light, to thereby be able to expand the eye box, which is a range that allows the user's eyes to visually recognize the video. Further, at least parts of the plurality of video light beams that have exited the video light replication unit 210 are overlapped with each other, and hence even when the user's eyes move in the eye box, the user can visually recognize the video having substantially uniform luminance.

In the intensity distribution of the light emitted from the pupil expanding prism 300 along the y-axis direction in FIG. 8, a ratio of the local minimum value to the local maximum value of adjacent intensities may be equal to or larger than ½. With this configuration, it is possible to achieve substantially uniform luminance of the video to be visually recognized by the user.

Figure 10A:
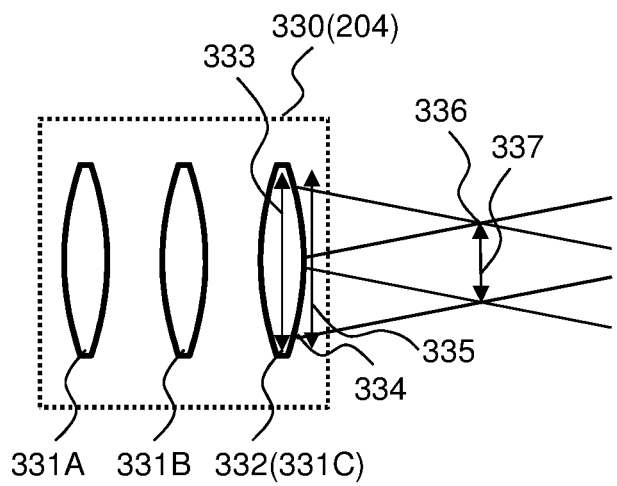
FIG. 10A and FIG. 10B are diagrams for illustrating examples of the projection optical units in the first embodiment.

FIG. 10A is a diagram for illustrating an example of the projection optical unit 204 in the first embodiment. In FIG. 10A, an example in which a projection optical unit 330 includes three lenses 331A, 331B, and 331C is illustrated. In the projection optical unit 330 illustrated in FIG. 10A, the lens 331C is a final lens 332 serving as the final optical element. Specifically, the video projection unit 200 and the video light replication unit 210 are configured such that at least one of the distances L1k between the partially reflecting surfaces 320 is smaller than or substantially equal to an outer diameter 333 of the final lens 332 serving as the final optical element.

Figure 10B:
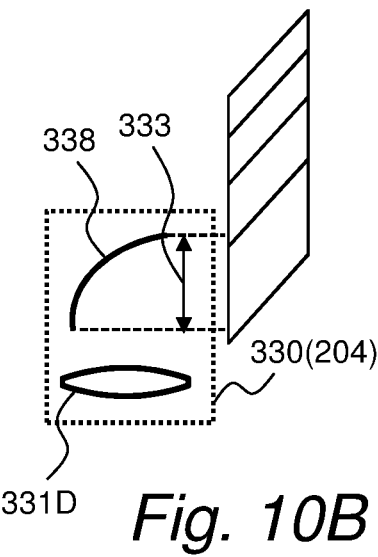

FIG. 10B is a diagram for illustrating another example of the projection optical unit 204 in the first embodiment. The projection optical unit 330 illustrated in FIG. 10B includes a lens 331D and a concave mirror 338, and the concave mirror 338 serves as the final optical element. The video projection unit 200 and the video light replication unit 210 are configured such that at least one of the distances L1k between the partially reflecting surfaces 320 is smaller than or substantially equal to the outer size 333 (length obtained by projecting the concave mirror 338 onto the entrance surface 310) of the concave mirror 338 serving as the final optical element.

In FIG. 10A and FIG. 10B, the form in which the final optical element is a lens or a concave mirror is illustrated, but this invention is not limited thereto, and various optical elements can be used. For example, a mirror or a prism configured to bend light and change its traveling direction without having a curvature may be used.

According to another aspect of this invention, the video projection unit 200 and the video light replication unit 210 are configured such that at least one of the distances L1k between the partially reflecting surfaces 320 is smaller than or substantially equal to an optical effective size of the surface that finally reflects, transmits, or refracts the video light among the surfaces included in the final optical element (lens 331C). Preferably, the video projection unit 200 and the video light replication unit 210 may be configured such that, assuming that k is an integer equal to or larger than 1 and equal to or smaller than N−1, all the distances L1k are smaller than or substantially equal to the optical effective size of the surface that finally reflects, transmits, or refracts the video light among the surfaces included in the final optical element.

For example, in the projection optical unit 330 illustrated in FIG. 10A, the surface that finally reflects, transmits, or refracts the video light among the surfaces of the final optical element is an exit surface 334 included in the final lens 332. Specifically, the video projection unit 200 and the video light replication unit 210 are configured such that at least one of the distances L1k between the partially reflecting surfaces 320 is smaller than or substantially equal to an optical effective diameter 335 of the exit surface 334 of the final lens 332. Even with such a configuration, at least parts of the plurality of video light beams that have exited the video light replication unit 210 are overlapped with each other, which allows the user to visually recognize the video prevented from partially becoming considerably dark.

According to another aspect of this invention, the video projection unit 200 and the video light replication unit 210 are configured such that at least one of the distances L1k between the partially reflecting surfaces 320 is smaller than or substantially equal to an exit pupil diameter 337 of a projection optical system of the projection optical unit 204. Preferably, the video projection unit 200 and the video light replication unit 210 may be configured such that, assuming that k is an integer equal to or larger than 1 and equal to or smaller than N−1, all the distances L1k are smaller than or substantially equal to the exit pupil diameter 337 of the projection optical system of the projection optical unit 204. For example, in the example illustrated in FIG. 10A, an exit pupil 336 is located at a spot at which the video light that has exited the projection optical unit 330 becomes the thinnest, and has the exit pupil diameter 337 as its diameter. Even with such a configuration, at least parts of the plurality of video light beams that have exited the video light replication unit 210 are overlapped with each other, which allows the user to visually recognize the video prevented from partially becoming considerably dark.

Assuming that k is at least one of integers equal to or larger than 2 and smaller than N, the distance L1k between the k-th partially reflecting surface and the (k+1)th partially reflecting surface may be smaller than the distance L1(k−1) between the (k−1)th partially reflecting surface and the k-th partially reflecting surface. Preferably, assuming that k is every integer equal to or larger than 2 and smaller than N, the distance L1k between the k-th partially reflecting surface and the (k+1)th partially reflecting surface may be smaller than the distance L1(k−1) between the (k−1)th partially reflecting surface and the k-th partially reflecting surface. While being propagated through the inside of the pupil expanding prism 300, the video light that has entered the pupil expanding prism 300 has the intensity attenuated each time the video light is reflected by or transmitted through each of the plurality of partially reflecting surfaces 320. By gradually narrowing the interval between the partially reflecting surfaces, it is possible to substantially equalize the intensity density of the plurality of video light beams output from the video light replication unit 210. With this configuration, it is possible to reduce the luminance unevenness of the video to be visually recognized by the user.

Figure 9B:
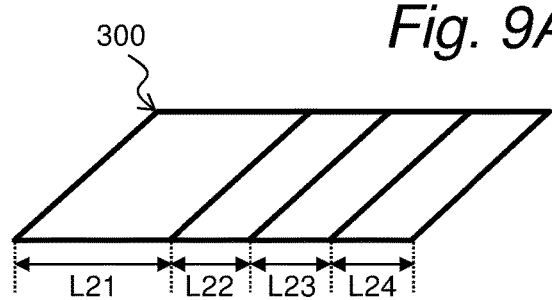

FIG. 9B is a plan view of the pupil expanding prism 300 in another aspect of this invention. Assuming that k is an integer equal to or larger than 1 and equal to or smaller than N−1, a distance between the k-th partially reflecting surface and the (k+1)th partially reflecting surface is defined as L2k. At this time, in regard to at least one pair of different integers m and n equal to or larger than 2 and equal to or smaller than N−1, L2m and L2n may be set substantially equal to each other. In regard to k being all integers equal to or larger than 2 and equal to or smaller than N−1, L2k may be set substantially equal to each other. Assuming that k is at least one of integers equal to or larger than 2 and equal to or smaller than N−1, L21 and L2k may be set substantially equal to each other. With this configuration, it is possible to reduce the number of kinds of thicknesses of an optical base material utilized at the time of manufacturing a pupil expanding prism, to thereby reduce the cost.

According to another aspect of this invention, Assuming that k is at least one of integers equal to or larger than 2 and smaller than N, the reflectance of the k-th partially reflecting surface may be smaller than or substantially equal to the reflectance of the (k+1)th partially reflecting surface. Preferably, assuming that k is every integer equal to or larger than 2 and smaller than N, the reflectance of the k-th partially reflecting surface may be smaller than or substantially equal to the reflectance of the (k+1)th partially reflecting surface. While being propagated through the inside of the pupil expanding prism 300, the video light that has entered the pupil expanding prism 300 has the intensity attenuated each time the video light is reflected by or transmitted through each of the plurality of partially reflecting surfaces 320. By gradually increasing the reflectance of, the partially reflecting surface 320, it is possible to substantially equalize the intensity density of the plurality of video light beams output from the video light replication unit 210, to thereby reduce the luminance unevenness of the video to be visually recognized by the user.

Figure 11A:
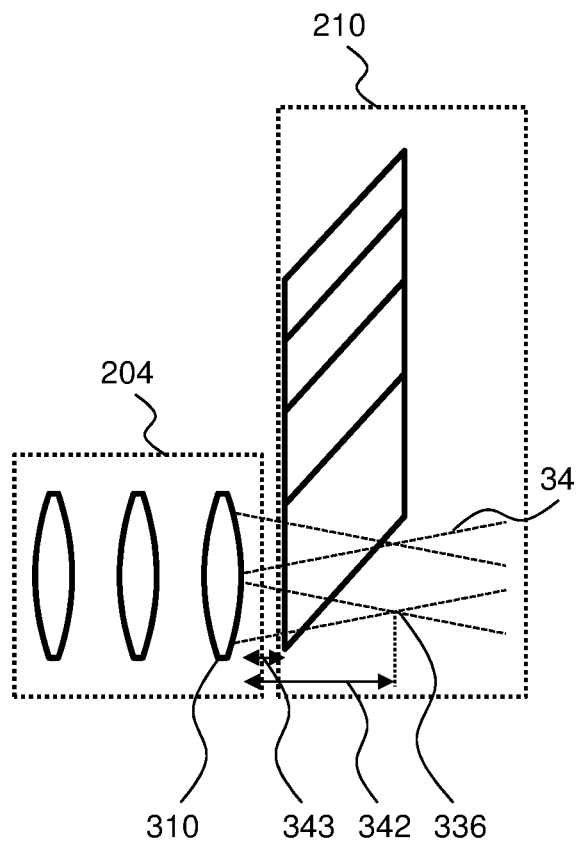
FIG. 11A and FIG. 11B are diagrams for illustrating examples of positional relationships between the projection optical unit and the video light replication unit according to the first embodiment.
Figure 11B:
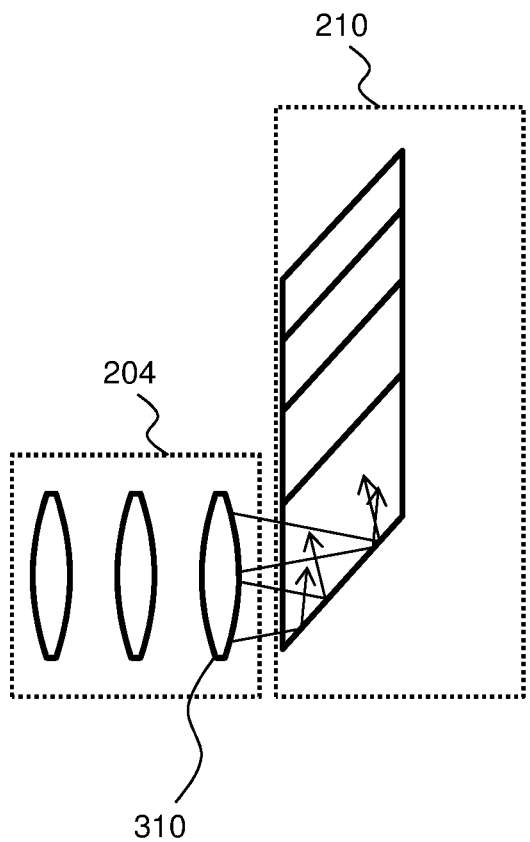

FIG. 11A is a diagram for illustrating an example of a positional relationship between the projection optical unit 204 and the video light replication unit 210. In actuality, the video light that has exited the projection optical unit 204 enters the video light replication unit 210 as illustrated in FIG. 11B, and is reflected by or transmitted through the partially reflecting surface 320 included in the video light replication unit 210. However, in FIG. 11A, a virtual ray 341 is illustrated on the assumption that the video light that has exited the projection optical unit 204 is propagated straight without entering the video light replication unit 210. In the first embodiment, a distance 342 from the final optical element included in the projection optical unit 204 to the exit pupil 336 of the projection optical unit 204 may be longer than a distance 343 from the final optical element to the entrance surface 310. The video light expands after passing the exit pupil. Video light 410 that has exited the pupil expanding prism 300 travels in different directions having different angles formed with respect to the x-axis depending on the angle of view (position of a pixel in an image). Therefore, when a distance by which the video light is propagated after passing the exit pupil inside the pupil expanding prism 300 becomes longer, at least a part of the video light 410 is displaced in the positive z-axis direction or the negative z-axis direction, to thereby be prevented from entering the entrance surface 11 of the light guide plate 801. By drawing out the exit pupil 336 of the projection optical unit 204, it is possible to enhance the coupling efficiency of the video light that has exited the video light replication unit 210 with respect to the light guide plate 220, to thereby enhance the light utilization efficiency. In addition, an eye box area at which the video light of all the angles of view (positions of pixels in an image) arrives can be enlarged, and even when the user's eyes greatly move with respect to the light guide plate 220, the user can visually recognize the video.

The video light that has exited the projection optical unit 204 is replicated by the video light replication unit 210 to become a plurality of video light beams, and then enters the light guide plate 220. the position of the exit pupil 336 of the projection optical unit 204 may be substantially equal to the position of the entrance surface 11 of the light guide plate 220 in any one of the plurality of video light beams replicated by the video light replication unit 210 to enter the light guide plate 220. Preferably, the position of the exit pupil 336 of the projection optical unit 204 may be located at substantially the center of the plurality of video light beams entering the entrance surface 11. With this configuration, it is possible to enhance the coupling efficiency of the video light that has exited the video light replication unit 210 with respect to the light guide plate 220, to thereby enhance the light utilization efficiency.

According to another aspect of this invention, the position of the exit pupil 336 of the projection optical unit 204 may be located inside the video light replication unit 210. Further, the position of the exit pupil 336 of the projection optical unit 204 may be located between the first partially reflecting surface 314 and the N-th partially reflecting surface 315, which are included in the video light replication unit 210. Preferably, the position of the exit pupil 336 of the projection optical unit 204 may be located at substantially the center between the first partially reflecting surface 314 and the N-th partially reflecting surface 315, which are included in the video light replication unit 210. The video light that has exited the projection optical unit 204 has the optical effective diameter 335 becoming the smallest at the position of the exit pupil 336, and hence the video light replication unit 210 can be downsized by being configured such that the exit pupil 336 of the projection optical unit 204 is located inside the video light replication unit 210.

Figure 12A:
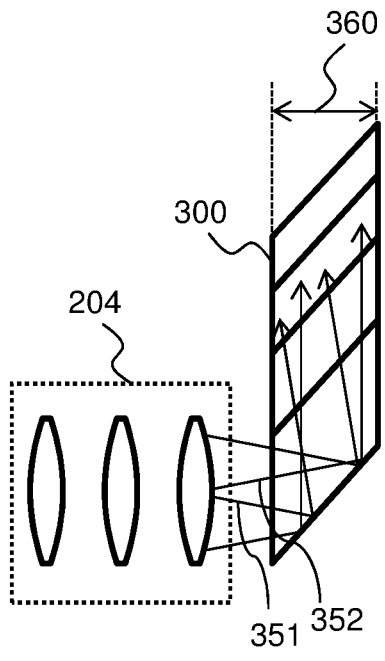
FIGS. 12A to 12D are diagrams for illustrating examples of positional relationships between the projection optical unit and the video light replication unit according to the first embodiment.
Figure 12B:
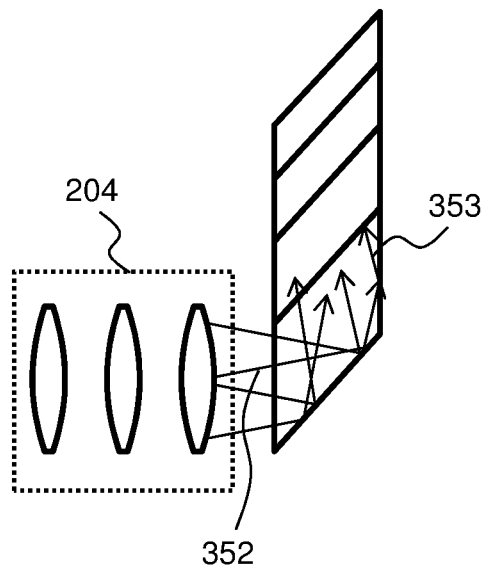

FIG. 12A is a diagram for illustrating an example of the ray of the video light that has exited the projection optical unit 204 and entered the pupil expanding prism 300 to be propagated through the inside of the pupil expanding prism 300. Among the rays of the video light forming the video to be displayed by the video display apparatus 101, a ray 351 and a ray 352 are rays exiting the projection optical unit 204 in the most downward and the most upward directions in FIG. 12A. The first partially reflecting surface 314 and the exit surface 311 may be located at such positions as to prevent the ray 352 from entering the exit surface 311 before being reflected by the partially reflecting surface 320 other than the first partially reflecting surface 314. For example, as illustrated in FIG. 12B, when the ray 352 enters the exit surface 311 before being reflected by the partially reflecting surface 320 other than the first partially reflecting surface 314, a ray 353 reflected by the exit surface 311 occurs, and the user ends up visually recognizing stray light of the inverted video. By preventing the ray 352 from entering the exit surface 311 before being reflected by the partially reflecting surface 320 other than the first partially reflecting surface 314, it is possible to prevent the user from visually recognizing the stray light.

Figure 12C:
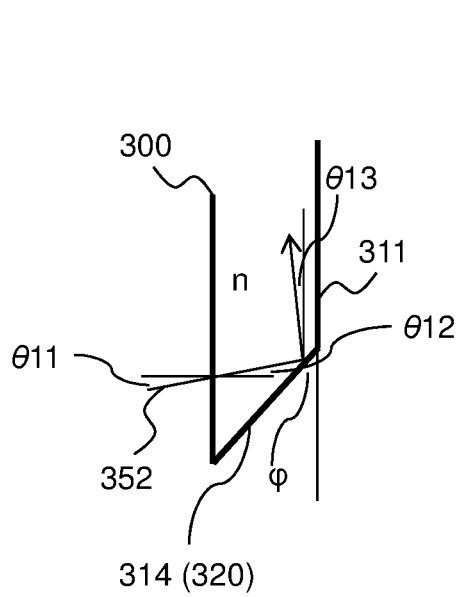

As illustrated in FIG. 12C, when an incident angle of the ray 352 with respect to the pupil expanding prism 300 is represented by θ11, the refractive index of the material of the pupil expanding prism 300 is represented by n, and an angle formed by the first partially reflecting surface 314 and the exit surface 311 is represented by φ, a refraction angle 912 is expressed as θ12=a sin(sin(θ11)÷n), and an angle θ13 formed by the ray 352 reflected by the first partially reflecting surface 314 and the exit surface 311 is expressed as θ13=90°−2φ−θ11. Therefore, in order to prevent the ray 352 from entering the exit surface 311 before being reflected by the partially reflecting surface 320 other than the first partially reflecting surface 314, it suffices that θ13 is substantially equal to 0 or equal to or larger than 0, and hence preferably, φ may be substantially equal to (90−θ11)÷2 or equal to or smaller than (90−θ11)÷2. In particular, θ11≥0 is satisfied, and hence preferably, φ may be substantially equal to 45 degrees or equal to or smaller than 45 degrees.

Figure 12D:
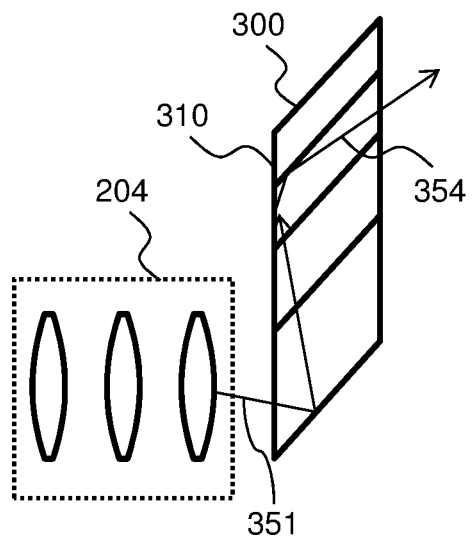

As illustrated in FIG. 12D, the projection optical unit 204 and the pupil expanding prism 300 may be configured so that the ray 351 enters the pupil expanding prism 300, is reflected by the first partially reflecting surface 314, and is then totally reflected by the entrance surface 310 before being reflected by any one of the second to N-th partially reflecting surfaces 320. When a ray 354 totally reflected by the entrance surface 310 is reflected by any one of the second partially reflecting surface 320 to the N-th partially reflecting surface 315 to exit the pupil expanding prism 300, the exit angle of the ray 354 exiting the pupil expanding prism 300 is large enough to avoid reaching the eye box, and hence the user is prevented from visually recognizing the stray light of the inverted image ascribable to the ray 354. With this configuration, it is possible to reduce a thickness 360 of the pupil expanding prism 300, to thereby downsize the pupil expanding prism 300.

According to another aspect of this invention, the projection optical unit 204 and the pupil expanding prism 300 may be configured such that the thickness 360 of the pupil expanding prism 300 is larger than the optical effective diameter 335 of the video light exhibited on the N-th partially reflecting surface 315 when the video light that has exited the projection optical unit 204 reaches the N-th partially reflecting surface 315. With this configuration, it is possible to prevent the ray 352 from entering the exit surface 311 before being reflected by the partially reflecting surface 320 other than the first partially reflecting surface 314, to thereby prevent the user from visually recognizing the stray light.

Preferably, the material of the pupil expanding prism 300 may be a material having such a high refractive index that the video light transmitted through the inside of the pupil expanding prism 300 to enter any one or both of the first partially reflecting surface 314 and the N-th partially reflecting surface 315 is totally reflected by any one or both of the first partially reflecting surface 314 and the N-th partially reflecting surface 315. With this configuration, it is no longer required to apply reflective coating to any one or both of the first partially reflecting surface 314 and the N-th partially reflecting surface 315, and it is possible to reduce the cost of the pupil expanding prism 300.

Preferably, the side surfaces 312 and 313 of the pupil expanding prism 300 may be subjected to a process of any one or both of sanding and black painting. This can prevent an occurrence of the stray light of the inverted image ascribable to the light that has entered the side surfaces 312 and 313.

In order to obtain a predetermined reflectance at the beam splitter surface 17 of the light guide plate 801, the beam splitter surface 17 may be coated with a metal film of aluminum or silver. Similarly, in order to obtain a predetermined reflectance at the partially reflecting surface 320 of the pupil expanding prism 300, the partially reflecting surface 320 may be coated with a metal film of aluminum or silver. A metal film has less polarization dependence of reflectance and transmittance, and the video display apparatus 101 can display a video having uniform intensity regardless of the polarization of the video light output from the video projection unit 200.

According to another aspect of this invention, in order to obtain a predetermined reflectance at the beam splitter surface 17 of the light guide plate 801 and the partially reflecting surface 320 of the pupil expanding prism 300, the partially reflecting surface 320 may be coated with a dielectric multilayer. The reflectance and transmittance characteristics of the dielectric multilayer coating depend on entering polarized light, and the reflectance of S polarization is higher than the reflectance of P polarization. However, in the first embodiment, the pupil expanding prism 300 and the light guide plate 801 are arranged so that the normal vector of the partially reflecting surface 320 included in the pupil expanding prism 300 is located in the x-y plane and the normal vector of the beam splitter surface 17 included in the light guide plate 801 is located in the x-z plane. Therefore, the video light that has entered as S-polarized light with respect to the partially reflecting surface 320 of the pupil expanding prism 300 enters as substantially P-polarized light with respect to the beam splitter surface 17 of the light guide plate 801, and the video light that has entered as P-polarized light with respect to the partially reflecting surface 320 of the pupil expanding prism 300 enters as S-polarized light with respect to the beam splitter surface 17 of the light guide plate 801.

In view of this, the video light replication unit 210 and the light guide plate 801 in the first embodiment may also be configured as follows. That is, the video light replication unit 210 includes one or both of a polarizing plate and a wavelength plate and the pupil expanding prism 300. In order to obtain a predetermined reflectance at the beam splitter surface 17 of the light guide plate 801 and the partially reflecting surface 320 of the pupil expanding prism 300, the beam splitter surface 17 and the partially reflecting surface 320 are coated with a dielectric multilayer. The video light emitted from the video projection unit 200 passes through any one or both of the polarizing plate and the wavelength plate to enter the pupil expanding prism 300. The polarization of the light entering the pupil expanding prism 300 is polarization (for example, +45 degree polarization, −45 degree polarization, right-handed polarization, or left-handed polarization) other than S polarization and P polarization with respect to the partially reflecting surface 320. Assuming that k is an integer equal to or larger than 2 and equal to or smaller than N, a light flux reflected by the k-th partially reflecting surface to exit the pupil expanding prism 300 is set as a light flux Ak, and a light flux obtained when the light flux Ak further passes through the light guide plate 801 to exit the light guide plate 801 is set as a light flux Bk. Assuming that k is an integer equal to or larger than 2 and equal to or smaller than N−1, the beam splitter surface 17 of the light guide plate 801 and the partially reflecting surface 320 of the pupil expanding prism 300 have such a reflection characteristic as to exhibit substantially the same light flux amount between the light fluxes Bk.

Specifically, assuming that k is an integer equal to or larger than 2 and equal to or smaller than N−1, when the light flux amount of light obtained by S-polarizing the light flux Ak with respect to the beam splitter surface 17 is set as AkS, the light flux amount of light obtained by P-polarizing the light flux Ak with respect to the beam splitter surface 17 is set as AkP, the reflectance of the S-polarized light on the beam splitter surface 17 is set as R17S, and the reflectance of the P-polarized light on the beam splitter surface 17 is set as R17P, the partially reflecting surface 320 may have such a reflection characteristic as to exhibit substantially the same value of AkP×R17P+AkS+R17S regardless of k between the partially reflecting surfaces 320. For example, assuming that N=5 is satisfied, when the polarization of light entering the pupil expanding prism 300 is circularly polarized and the reflectances of the S-polarized light and the P polarized light are set as RS and RP, RS=RP=100% is established on the first partially reflecting surface, RS=45% and RP=15% are established on the second partially reflecting surface, RS=65% and RP=25% are established on the third partially reflecting surface, RS=80% and RP=45% are established on the fourth partially reflecting surface, and RS=RP=100% is established on the fifth partially reflecting surface. With this configuration, it is possible to achieve substantially the same light flux amount between the video light fluxes reflected by the different partially reflecting surfaces 320 to exit the light guide plate 801, and it is possible to achieve substantially uniform luminance of the video to be visually recognized by the user.

Figure 25A:
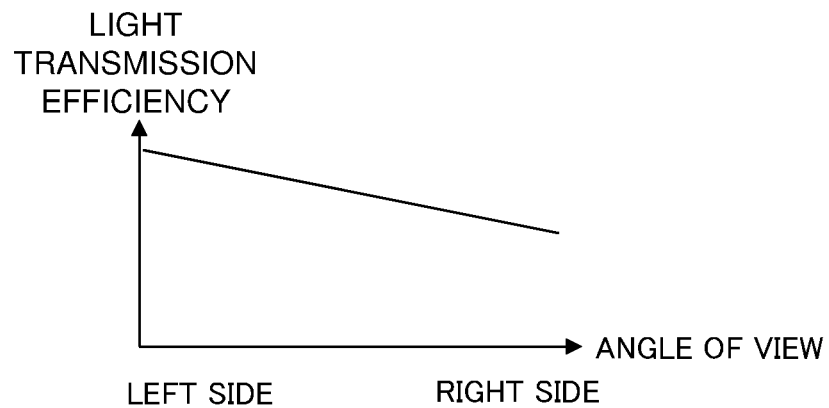
FIGS. 25A to 25C are diagrams for illustrating a example of conversion of a image to compensate characteristics.
Figure 25B:
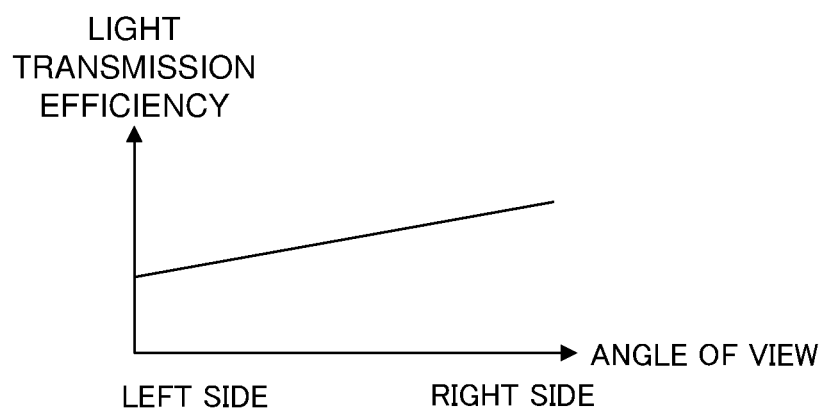
Figure 25C:
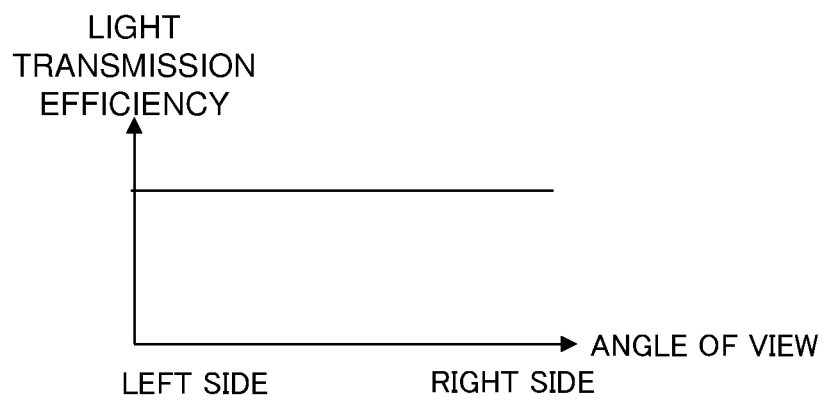

The image signal processing module 104 of the video display system 100 may transmit a display image to the video display apparatus 101 after performing image conversion for compensating for the characteristic of the video display apparatus 101. For example, when light transmission efficiency differs depending on the angle of view (position of a pixel in an image) due to the reflection characteristic of the beam splitter surface 17 of the light guide plate 801 or the partially reflecting surface 320 of the pupil expanding prism 300, the image signal processing module 104 may convert the image to compensate for the characteristic. More specifically, for example, as shown in FIG. 25A, when the beam splitter surface 17 of the light guide plate 801 or the partially reflecting surface 320 of the pupil expanding prism 300 has such a characteristic that the light transmission efficiency is smaller on the right side of a video than with the other angles of view, in order to prevent the right side of the video to be visually recognized by the user from becoming darker, the image signal processing module 104 converts the image so as to raise the luminance of the video on the right side. For example, the image signal processing module 104 converts the image so as to lower the luminance of the angles of view other than on the right side of the video. With this configuration, in a projection video signal output from the video projection unit 200, as shown in FIG. 25B, the output of the video light is larger on the right side of the angle of view of the video. As a result, the output from the light guide plate 801 is substantially constant as shown in FIG. 25C, and the video display apparatus 101 can display the video with further uniform luminance.

As another example, when the light transmission efficiency of a specific angle of view of the video has wavelength dependence due to the wavelength dependence of the reflection characteristic of the beam splitter surface 17 of the light guide plate 801 or the partially reflecting surface 320 of the pupil expanding prism 300, the image signal processing module 104 may convert the image so as to compensate for the wavelength dependence. More specifically, for example, when transmission efficiency on the long wavelength side is high in the light transmission efficiency of the angle of view on the right side of the video, in order to prevent the video from becoming red on the right side, the image signal processing module 104 converts the image so as to inhibit the video from becoming red on the right side. With this configuration, the video display apparatus 101 can display a video with further uniform colors.

In the video display system 100 illustrated in FIG. 23A and FIG. 23B, when the video display apparatus 101L for the left eye has such an optical characteristic that the light transmission efficiency of the angle of view on the right side (namely, pixel on the right side of a screen) is low and the video display apparatus 101R for the right eye has such an optical characteristic that the light transmission efficiency of the angle of view on the left side (namely, pixel on the left side of a screen) is low, the video projection unit 200R for the right eye and the video projection unit 200L for the left eye have opposite brightness distributions of the video light to be output therefrom.

As another example, in the video display system 100 illustrated in FIG. 23A and FIG. 23B, when the video display apparatus 101L for the left eye has such an optical characteristic that the light transmission efficiency of the angle of view on the lower side (namely, pixel on the lower side of a screen) is low and the video display apparatus 101R for the right eye also has such an optical characteristic that the light transmission efficiency of the angle of view on the lower side (namely, pixel on the lower side of a screen) is low, the video projection unit 200R for the right eye and the video projection unit 200L for the left eye have the same brightness distribution of the video light to be output therefrom.

As another example, in the video display system 100 illustrated in FIG. 23A and FIG. 23B, when at least one of the optical elements included in the video projection unit 200, the video light replication unit 210, or the light guiding unit 230 has an optical characteristic different from a predetermined optical characteristic or is arranged at a position deviated from a predetermined position, the respective videos displayed by the video display apparatus 101R for the right eye and the video display apparatus 101L for the left eye may be different in size from each other or may be shifted in position from each other. In that case, the image signal processing module 104 may transmit, to the video display apparatus 101, a display image obtained by converting an image to be displayed by at least one of the video display apparatus 101R for the right eye and the video display apparatus 101L for the left eye so that at least a part of the image is trimmed, subjected to scaling, or shifted in display position. When the image signal processing module 104 has trimmed at least a part of the image or has subjected at least a part of the image to scaling, a part of the pixels included in the panel of the panel unit 203 of at least one of the video display apparatus 101R for the right eye and the video display apparatus 101L for the left eye are used, while the other part of the pixels are not used. When the image signal processing module 104 has converted the image so as to shift the display position of the image, a part of the pixels included in the panel of the panel unit 203 of the video display apparatus 101R for the right eye and the video display apparatus 101L for the left eye are used, while the other part of the pixels are not used, and the part of the pixels that are not used differs between the panel for the right eye and the panel for the left eye.

Figure 13A:
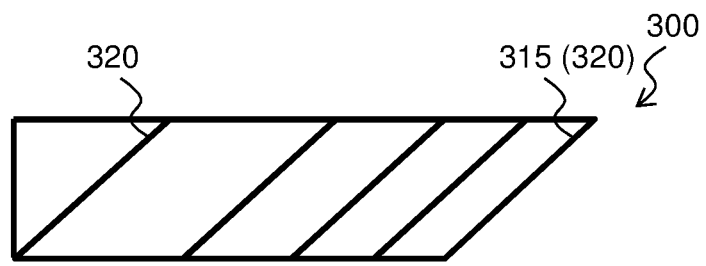
FIGS. 13A to 13C are diagrams for illustrating examples of the pupil expanding prisms according to the first embodiment.
Figure 13B:
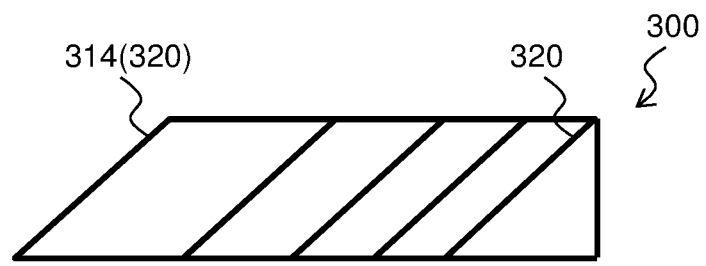
Figure 13C:
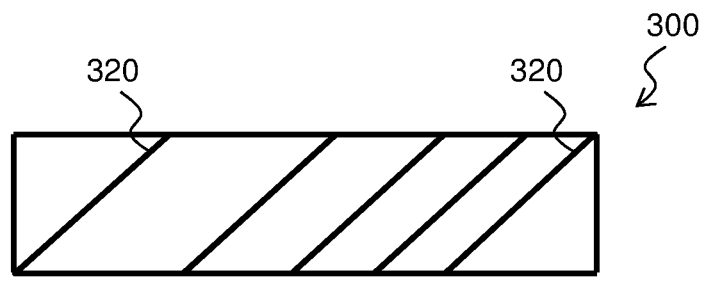

In the pupil expanding prism 300 described above, the first and N-th partially reflecting surface 320 are the reflecting side surfaces 314 and 315, but this invention is not limited to this configuration. For example, as illustrated in FIG. 13A, FIG. 13B, and FIG. 13C, the pupil expanding prism 300 may include any one or both of the first or N-th partially reflecting surface 320 in its inside. The first partially reflecting surface 320 provided inside the pupil expanding prism 300, which is illustrated in FIG. 13A or FIG. 13C, may be set to have a reflectance of approximately 100 percent, or may be configured to have a reflectance larger than 0 percent or smaller than 100 percent so that at least a part of the light that has entered the first partially reflecting surface 320 is transmitted through the first partially reflecting surface 320 to exit the pupil expanding prism 300.

Figure 9C:
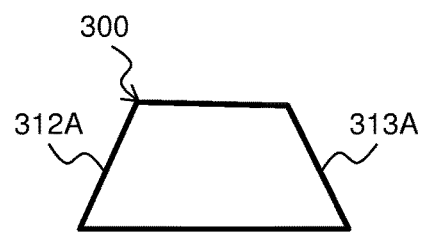
Figure 9D:
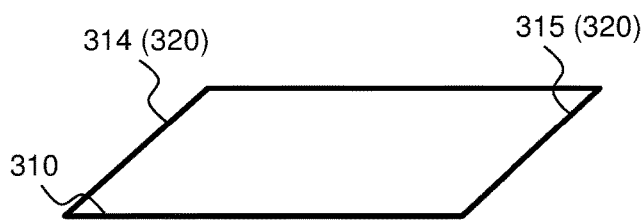

Further, in the pupil expanding prism 300 described above, the side surface 312 and the side surface 313 are parallel to each other, but this invention is not limited to this configuration. For example, as illustrated in FIG. 9C, side surfaces 312A and 313A are not required to be parallel to each other. With this configuration, it is possible to improve the degree of freedom in design, and to reduce the volume and mass of the pupil expanding prism 300.

Further, in the above-mentioned embodiment, the pupil expanding prism 300 and the light guide plate 801 are not in contact with each other, but this invention is not limited to this configuration. For example, the video display apparatus 101 may be configured such that the pupil expanding prism 300 and the light guide plate 801 are in contact with each other, or the pupil expanding prism 300 and the light guide plate 801 may be joined to each other by a transparent adhesive or an optical contact.

As described above, according to the first embodiment, the video light replication unit 210 can replicate the video light into a plurality of video light beams overlapped with each other, and can increase the light flux of the video light beams entering the light guide plate 220, and hence it is possible to provide the video display apparatus 101 and the video display system 100, which provide a wide eye box and are capable of displaying a video having uniform luminance by employing a light guide plate.

Second Embodiment

In a second embodiment of this invention, the light guiding unit 230 includes a light guide plate 802 and an angle-of-view correction unit (triangular prism 400). In the second embodiment, a description is mainly given of differences from the above-mentioned embodiment, and the same components as those of the above-mentioned embodiment are denoted by the same reference symbols, and their descriptions are omitted below.

Figure 14:
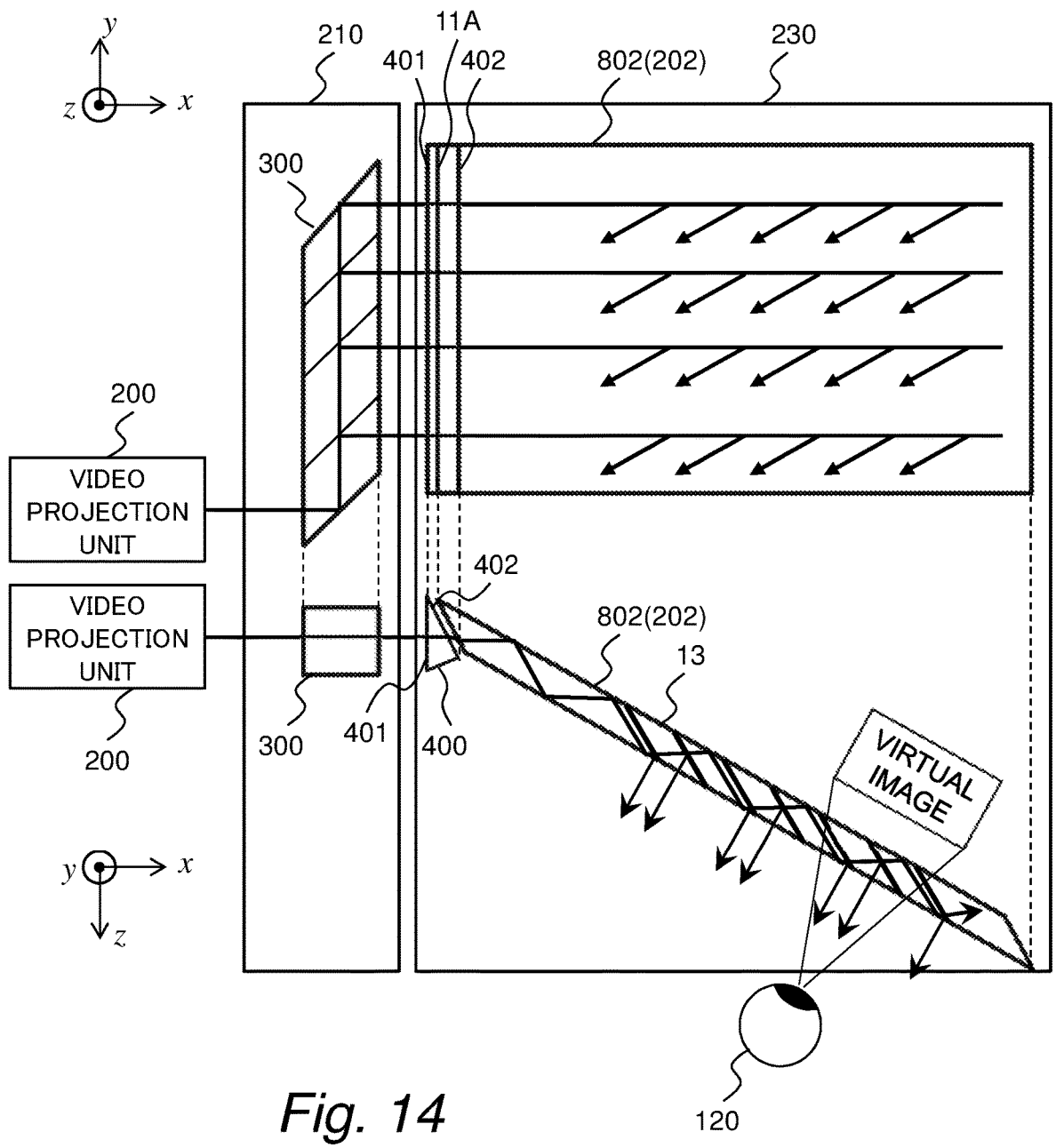
FIG. 14 is a diagram for illustrating a configuration example of a video display apparatus according to a second embodiment.

FIG. 14 is a diagram for illustrating a configuration example of the video display apparatus 101 according to the second embodiment, in which a view from the front of the light guide plate 802 is illustrated on the upper side and a view from the top side of the light guide plate 802 is illustrated on the lower side. The light guiding unit 230 includes the light guide plate 802 and the angle-of-view correction unit. The angle-of-view correction unit includes the triangular prism 400. FIG. 15A, FIG. 15B, and FIG. 15C are a front view, a plan view, and a side view, respectively, of the light guide plate 802.

In FIG. 14, the pupil expanding prism 300, the triangular prism 400, and the light guide plate 802 are not in contact with each other, but this invention is not limited to this configuration. For example, the pupil expanding prism 300 and the triangular prism 400, or the triangular prism 400 and the light guide plate 802, or the three of the pupil expanding prism 300, the triangular prism 400, and the light guide plate 802, may be brought into contact with each other, caused to adhere to each other by a transparent adhesive, or joined to each other by an optical contact.

The triangular prism 400 has at least two surfaces, that is, an entrance surface 401 and an exit surface 402. The refractive index of the triangular prism 400 may be substantially equal to the refractive index of the light guide plate 802.

The video light that has exited the video light replication unit 210 enters the triangular prism 400 through the entrance surface 401 of the triangular prism 400, and is propagated through the inside of the triangular prism 400 to exit the exit surface 402. The video light that has exited the triangular prism 400 enters the inside the light guide plate 802 through an entrance surface 11A.

The triangular prism 400 and the light guide plate 802 are configured such that the exit surface 402 of the triangular prism 400 and the entrance surface 11A of the light guide plate 802 are substantially parallel to each other, and that an angle formed by the entrance surface 401 of the triangular prism 400 and the first inner reflection surface 13 of the light guide plate 802 is approximately two times as large as the angle formed by the N beam splitter surfaces 17 and the first inner reflection surface 13. With this configuration, the angle of view (size of the video expressed by an angle) of the video light exiting the second inner reflection surface 14 can be set substantially the same as the angle of view (size of the video expressed by an angle) of the video light entering the triangular prism 400 through the entrance surface 401. Preferably, the triangular prism 400 and the light guide plate 802 may be configured such that the angle formed by the entrance surface 401 and the exit surface 402 of the triangular prism 400 is substantially equal to the angle formed by the N beam splitter surfaces 17 and the first inner reflection surface 13, and that an angle formed by the entrance surface 11A of the light guide plate 802 and the first inner reflection surface 13 of the light guide plate 802 is substantially equal to the angle formed by the N beam splitter surfaces 17 and the first inner reflection surface 13. The configuration of the light guide plate 802 other than the angle of the entrance surface 11A is the same as that of the light guide plate 801 described above.

According to the second embodiment, all of the entrance surface 11A and the N beam splitter surfaces 17 of the light guide plate 802 can be set substantially parallel to each other, and it is possible to reduce the manufacturing process of the light guide plate 802, to thereby reduce the cost.

Third Embodiment

In a third embodiment of this invention, the video light replication unit 210 includes a pupil expanding prism 301 in place of the pupil expanding prism 300. The pupil expanding prism 301 in the third embodiment is configured so that at least a part of the entering video light enters the second partially reflecting surface without entering the first partially reflecting surface. In the third embodiment, the same components as those of the above-mentioned embodiments are denoted by the same reference symbols, and their descriptions are omitted below.

FIG. 16 shows a front view, a plan view, and a side view, respectively, of the pupil expanding prism 301. The pupil expanding prism 301 includes the first partially reflecting surface in its inside. The first partially reflecting surface reflects at least a part of the light, and transmits at least a part of the light.

The video light emitted from the video projection unit 200 enters the pupil expanding prism 301 through the entrance surface 310 of the pupil expanding prism 301. At least a part of the light that has entered the pupil expanding prism 301 enters the first partially reflecting surface. At least a part of the light that has entered the first partially reflecting surface is transmitted through the first partially reflecting surface to exit the exit surface 311. At least a part of the light that has entered the first partially reflecting surface is reflected by the first partially reflecting surface to enter the second partially reflecting surface.

Meanwhile, at least a part of the light that has entered the pupil expanding prism 301 enters the second partially reflecting surface without being reflected by or transmitted through the first partially reflecting surface. At least a part of the light that has entered the second partially reflecting surface is reflected by the second partially reflecting surface, while at least a part of the light that has entered the second partially reflecting surface is transmitted through the second partially reflecting surface.

In the front view of FIG. 16, the entering light 316 entering the pupil expanding prism 301 is located between an intersection line B21, which is an intersection line between the first partially reflecting surface and the entrance surface 310, and an intersection line B23, which is an intersection line between the third partially reflecting surface and the entrance surface 310.

Figure 17:
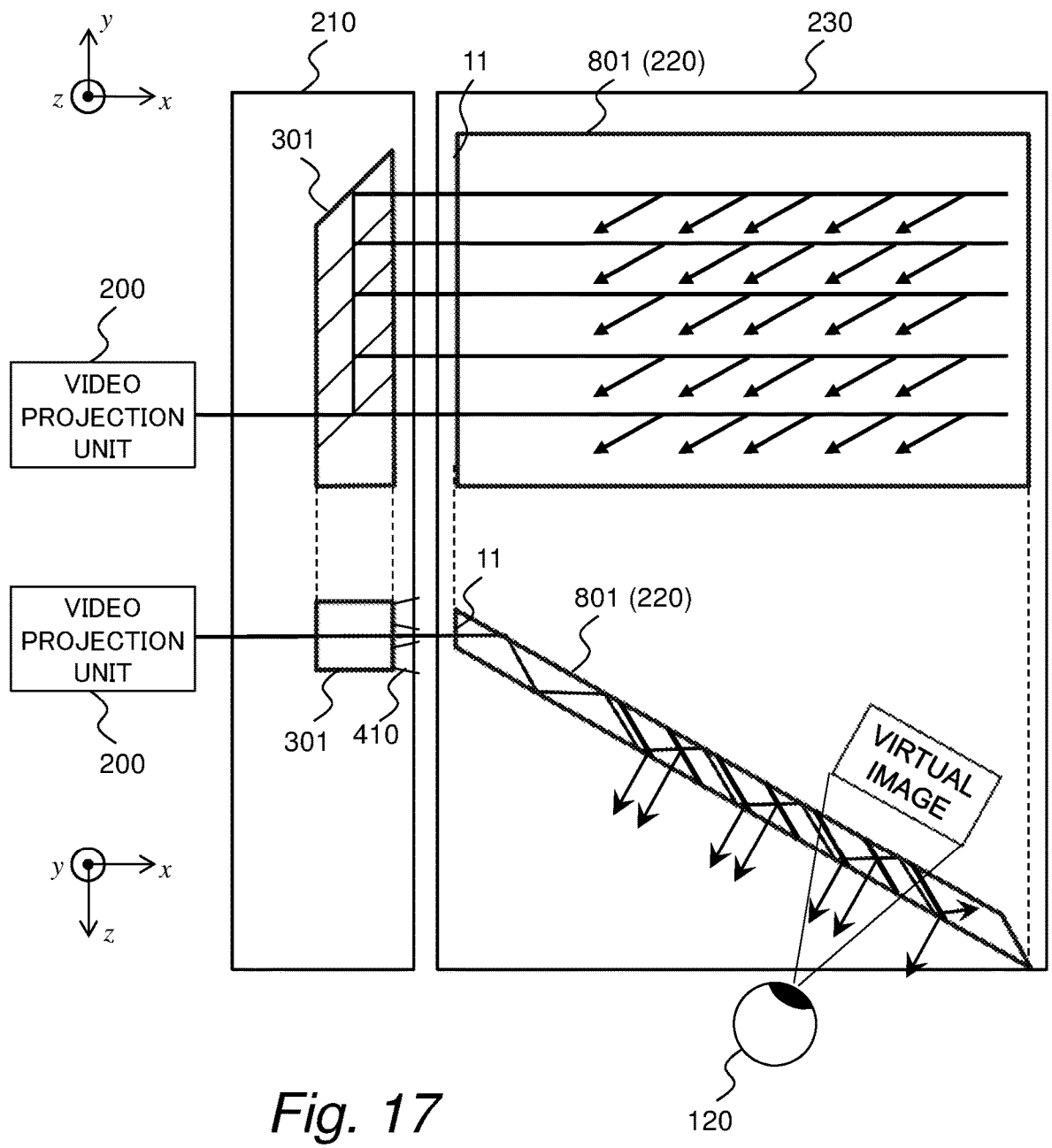
FIG. 17 is a diagram for illustrating a configuration example of a video display apparatus according to the third embodiment.

FIG. 17 is a diagram for illustrating an example of the video display apparatus 101 according to the third embodiment, in which a view from the front surface side of the light guide plate 801 is illustrated on the upper side and a view from the top side of the light guide plate 801 is illustrated on the lower side. The video light replication unit 210 includes the pupil expanding prism 301. A part of the video light emitted from the video projection unit 200 is reflected by the first or second partially reflecting surface of the pupil expanding prism 301 to be propagated in the y-axis direction, and is reflected by any one of the second to N-th partially reflecting surfaces to be propagated in the x-axis direction, to thereby exit the pupil expanding prism 301. The video light 410 that has exited the pupil expanding prism 300 travels in directions having different angles with respect to the x-axis depending on the angle of view (position of a pixel in an image). Therefore, when a distance by which the video light is propagated inside the pupil expanding prism 301 becomes longer, at least a part of the video light 410 is displaced in the positive z-axis direction or the negative z-axis direction, to thereby be prevented from entering the entrance surface 11 of the light guide plate 801. According to the third embodiment, at least a part of the video light that has entered the pupil expanding prism 301 enters the second partially reflecting surface without entering the first partially reflecting surface, and hence it is possible to shorten a distance by which the video light travels after entering the pupil expanding prism 301 until entering the N-th partially reflecting surface, and to reduce the displacement of the video light 410 in the positive z-axis direction or the negative z-axis direction. With this configuration, it is possible to enhance the light utilization efficiency of the video light. In addition, the light utilization efficiency of the video light 410 corresponding to the angles of view (positions of pixels in an image) at the four corners or four sides of the video can be particularly enhanced, and hence it is possible to achieve substantially uniform luminance of the video to be visually recognized by the user.

In the plan view of FIG. 16, the pupil expanding prism 301, assuming that k is an integer equal to or larger than 1 and equal to or smaller than N, an intersection point between the k-th partially reflecting surface 320 and the entrance surface 310 is set as a point A$3k$. In addition, assuming that k is an integer equal to or larger than 1 and equal to or smaller than N−1, a distance between the k-th partially reflecting surface and the (k+1)th partially reflecting surface is defined as L$3k$ representing a distance between the point A$3k$ and a point A$3(k+1)$. The video projection unit 200 and the video light replication unit 210 are configured such that, in the pupil expanding prism 301 in the third embodiment, at least one of the distances L31 to L$3(N-1)$ is smaller than or substantially equal to the outer size of the final optical element. The other configuration of the pupil expanding prism 301 is the same as that of the pupil expanding prism 300 described above.

With this configuration, at least parts of the plurality of video light beams that have exited the video light replication unit 210 are overlapped with each other, and hence a part of the video to be visually recognized by the user is prevented from becoming considerably dark, which allows the user to visually recognize the video having a substantially uniform luminance. In addition, the video light replication unit 210 replicates the video light, to thereby be able to expand the eye box, which is a range that allows the user's eyes to visually recognize the video.

According to the third embodiment, it is possible to shorten the distance by which the video light travels after entering the pupil expanding prism 301 until entering the N-th partially reflecting surface, to thereby downsize the pupil expanding prism 301. It is also possible to enhance the light utilization efficiency of the video light, to thereby increase the uniformity in luminance of the video to be visually recognized by the user.

Fourth Embodiment

In a fourth embodiment of this invention, a pupil expanding prism 302 is configured such that its entrance surface and its exit surface are substantially perpendicular to each other. In the fourth embodiment, the same components as those of the above-mentioned embodiments are denoted by the same reference symbols, and their descriptions are omitted below.

Figure 18:
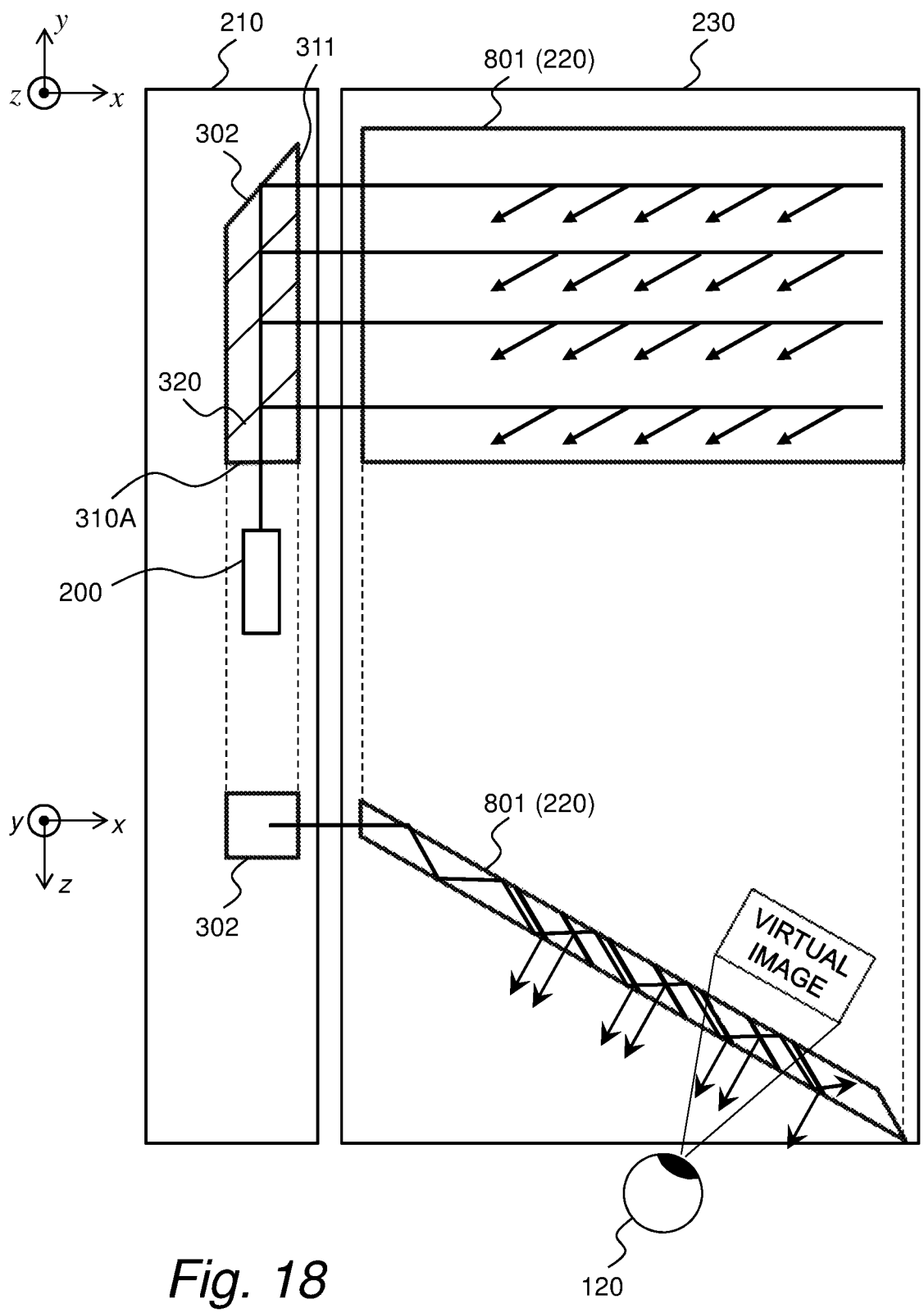
FIG. 18 is a diagram for illustrating a configuration example of a video display apparatus according to a fourth embodiment.

FIG. 18 is a diagram for illustrating an example of the video display apparatus 101 according to the fourth embodiment, in which a view from the front surface side of the light guide plate 801 is illustrated on the upper side and a view from the top side of the light guide plate 801 is illustrated on the lower side. The video light replication unit 210 in the fourth embodiment includes the pupil expanding prism 302 in place of the pupil expanding prism 300. An entrance surface 310A of the pupil expanding prism 300 and the exit surface 311 are substantially perpendicular to each other. The video light emitted from the video projection unit 200 enters the pupil expanding prism 302 through the entrance surface 310A.

Preferably, assuming that k is at least one of integers equal to or larger than 2 and smaller than N, a distance L4k between the k-th partially reflecting surface and the (k+1)th partially reflecting surface may be smaller than or substantially equal to a distance L4($k$–1) between the (k–1)th partially reflecting surface and the k-th partially reflecting surface. It is further preferred that, assuming that k is every integer equal to or larger than 2 and smaller than N, the distance L1k between the k-th partially reflecting surface and the (k+1)th partially reflecting surface be smaller than or substantially equal to the distance L1($k$–1) between the (k–1)th partially reflecting surface and the k-th partially reflecting surface.

Figure 19:
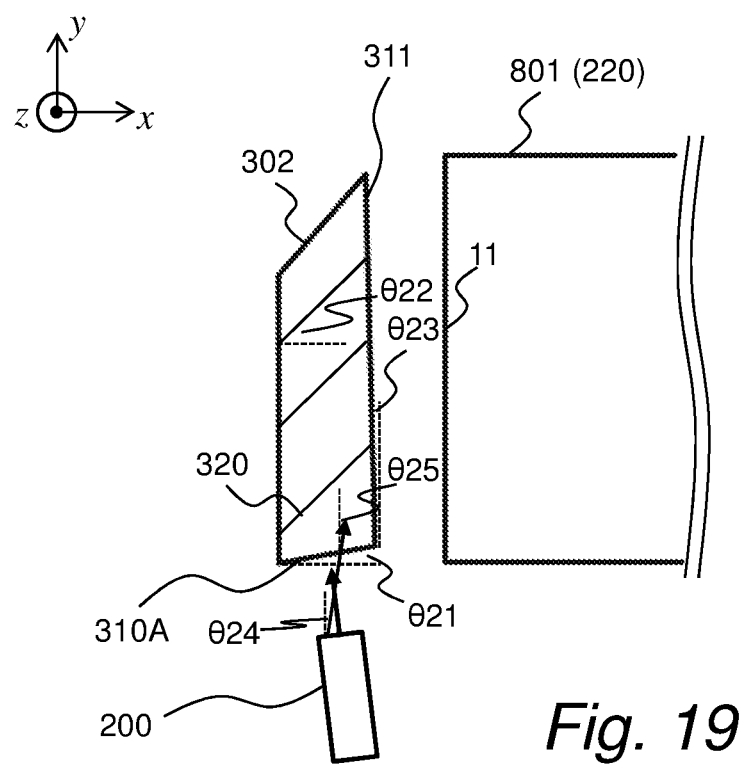
FIG. 19 is a diagram for illustrating an example of a pupil expanding prisms according to the fourth embodiment.

FIG. 19 is a diagram for illustrating another example of the pupil expanding prism 302 in the fourth embodiment. In FIG. 19, a coordinate system in which the entrance surface 11 of the light guide plate 801 is parallel to the y-axis is employed. It is assumed that an angle formed by the entrance surface 310A of the pupil expanding prism 302 and the x-axis is set as θ21, an angle formed by the partially reflecting surface 320 and the x-axis is set as θ22, an angle formed by the exit surface 311 and the y-axis is set as θ23, the largest one of angles formed by the video light output from the video projection unit 200 and the y-axis is set as θ24, and an angle formed by the output light from the video projection unit 200 having the angle of θ24 with respect to the y-axis and the y-axis when the output light has entered the pupil expanding prism 302 is set as θ25. It is also assumed that the angles θ21 to θ25 have a positive angle in the clockwise direction in FIG. 19. At this time, the pupil expanding prism 302 may be configured so that 90−2×θ22+θ21+θ23 is approximately 0. With this configuration, the light that has perpendicularly entered the pupil expanding prism 302 perpendicularly exits the pupil expanding prism 302, and hence the angle of view (size of the video expressed by an angle) of the video light exiting the pupil expanding prism 302 can be set substantially the same as the angle of view (size of the video expressed by an angle) of the video light entering the pupil expanding prism 302. Further, the pupil expanding prism 302 may be configured so that θ23+θ25 is approximately 0 or smaller than 0. In other words, θ25 is approximately −θ23 or smaller than −θ23. This can prevent the light that has entered the pupil expanding prism 302 from being totally reflected by the exit surface 311 to cause the stray light of the inverted image.

The other configuration of the pupil expanding prism 302 is the same as that of the pupil expanding prism 300 described above.

With this configuration, it is possible to substantially equalize the intensity density of the plurality of video light beams output from the video light replication unit 210, to thereby reduce the luminance unevenness of the video to be visually recognized by the user.

According to another aspect of this invention, assuming that k is at least one of integers equal to or larger than 1 and smaller than N, the reflectance of the k-th partially reflecting surface may be smaller than or substantially equal to the reflectance of the (k+1)th partially reflecting surface. Preferably, assuming that k is every integer equal to or larger than 1 and smaller than N, the reflectance of the k-th partially reflecting surface may be smaller than or substantially equal to the reflectance of the (k+1)th partially reflecting surface. With this configuration, it is possible to substantially equalize the intensity density of the plurality of video light beams output from the video light replication unit 210, to thereby reduce the luminance unevenness of the video to be visually recognized by the user.

According to the fourth embodiment, the arrangement of the video projection unit 200 is different from that of the case in the above-mentioned embodiments, and hence it is possible to improve the degree of freedom in design of the video display apparatus 101.

Fifth Embodiment

In a fifth embodiment of this invention, the pupil expanding prism 303 is configured to replicate the rays in two different directions parallel to each other. In the fifth embodiment, the same components as those of the above-mentioned embodiments are denoted by the same reference symbols, and their descriptions are omitted below.

Figure 20:
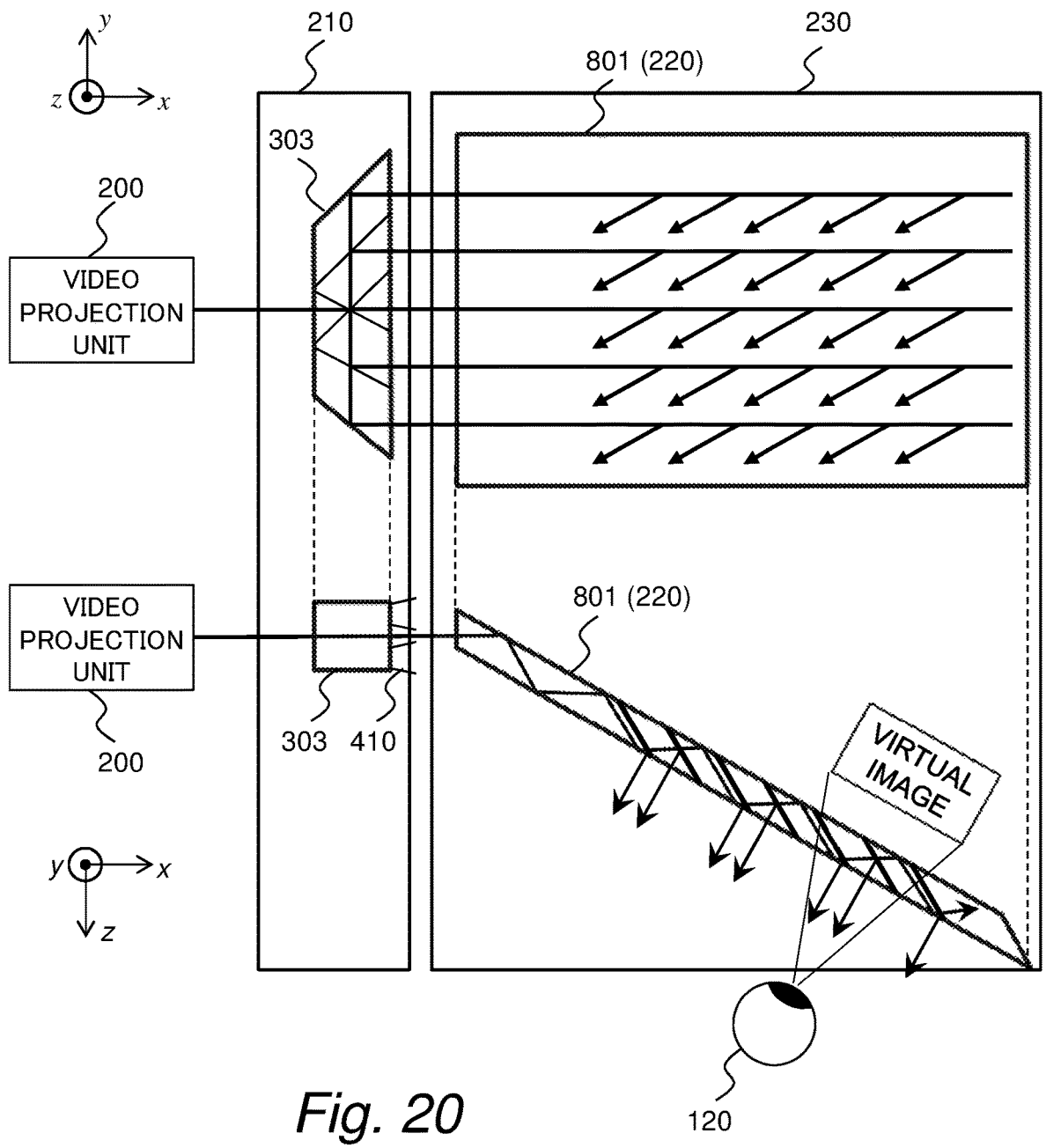
FIG. 20 is a diagram for illustrating a configuration example of a video display apparatus according to a fifth embodiment.

FIG. 20 is a diagram for illustrating an example of the video display apparatus 101 according to the fifth embodiment, in which a view from the front surface side of the light guide plate 801 is illustrated on the upper side and a view from the top side of the light guide plate 801 is illustrated on the lower side. The video light replication unit 210 in the fifth embodiment includes the pupil expanding prism 303 in place of the pupil expanding prism 300.

Figure 21:
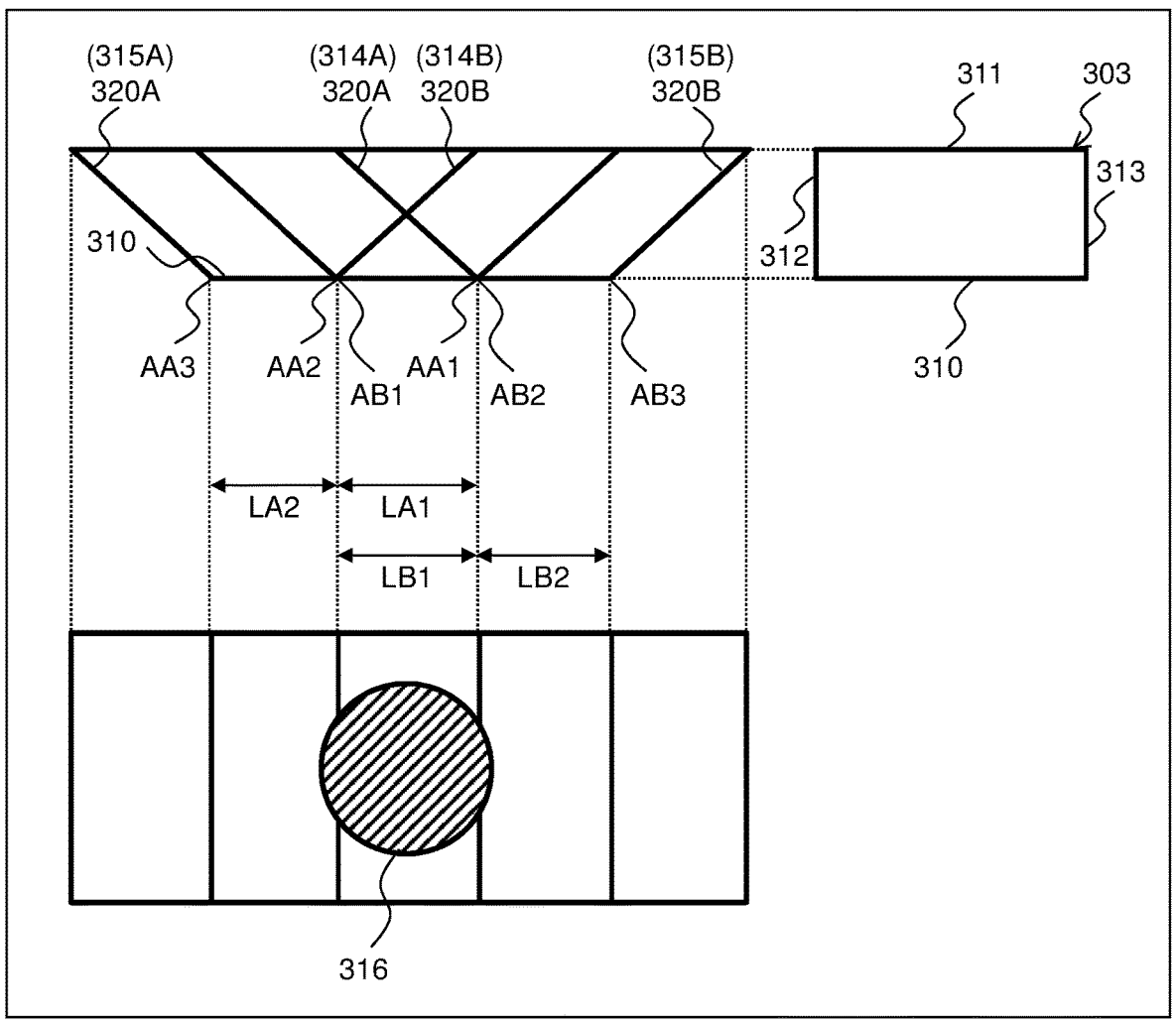
FIG. 21 is a diagram for illustrating an example of a pupil expanding prisms according to the fifth embodiment.

FIG. 21 shows a front view, a plan view, and a side view, respectively, of the pupil expanding prism 303. The pupil expanding prism 303 includes at least two substantially parallel partially reflecting surfaces 320A and at least two substantially parallel partially reflecting surfaces 320B. The partially reflecting surface 320A and the partially reflecting surface 320B are not parallel to each other. An angle formed by the partially reflecting surface 320A and the partially reflecting surface 320B may be approximately 90 degrees, or may be other than 90 degrees. Assuming that N and M are integers equal to or larger than 2, when N partially reflecting surfaces 320A and M partially reflecting surfaces 320B are included, one of the N partially reflecting surfaces 320A that is the closest to the partially reflecting surface 320B is set as a first partially reflecting surface 314A, and the other partially reflecting surfaces 320A are set as the second partially reflecting surface 320A to an N-th partially reflecting surface 315A in ascending order of the distance from the first partially reflecting surface 314A. In the same manner, one of the M partially reflecting surfaces 320B that is the closest to the partially reflecting surface 320A is set as a first partially reflecting surface 314B, and the other partially reflecting surfaces 320B are set as the second partially reflecting surface 320B to the M-th partially reflecting surface 315B in ascending order of the distance from the first partially reflecting surface 314B. The first partially reflecting surface 314A and the first partially reflecting surface 314B intersect with each other, and have an intersection line.

The first to N-th partially reflecting surfaces 320A and the first to M-th partially reflecting surfaces 320B are each configured to reflect at least a part of the light. In particular, the first to (N−1)th partially reflecting surfaces 320A and the first to (M−1)th partially reflecting surfaces 320B each reflect at least a part of the light, and transmit at least a part of the light.

The video light emitted from the video projection unit 200 enters the pupil expanding prism 303 through the entrance surface 310. At least a part of the light that has entered the pupil expanding prism 303 enters the first partially reflecting surface 314A or the first partially reflecting surface 314B.

In the plan view of the pupil expanding prism 303 shown in FIG. 21, assuming that k is an integer equal to or larger than 1 and equal to or smaller than N, an intersection point between the k-th partially reflecting surface 320A and the entrance surface 310 is set as a point AAk. In addition, assuming that k is an integer equal to or larger than 1 and equal to or smaller than N−1, a distance between the k-th partially reflecting surface and the (k+1)th partially reflecting surface is defined as LAk representing a distance between the point AAk and a point AA(k+1). Assuming that s is an integer equal to or larger than 1 and equal to or smaller than M, an intersection point between the s-th partially reflecting surface 320B and the entrance surface 310 is set as a point ABs. Assuming that s is an integer equal to or larger than 1 and equal to or smaller than M−1, a distance between the s-th partially reflecting surface and the (s+1)th the partially reflecting surface is defined as LBs, which is a distance between the point ABs and a point AB(s+1). Of the optical elements included in the video projection unit 200, the optical element that reflects, transmits, or refracts the video light immediately before the video light is emitted from the video projection unit 200 is referred to as "final optical element". At this time, the video projection unit 200 and the video light replication unit 210 are configured such that at least one of the distances LAk and LBs between the partially reflecting surfaces 320 is smaller than or substantially equal to the outer size of the final optical element. The other configuration of the pupil expanding prism 303 is the same as that of the pupil expanding prism 300 described above.

With this configuration, at least parts of the plurality of video light beams that have exited the video light replication unit 210 are overlapped with each other, and hence a part of the video to be visually recognized by the user is prevented from becoming considerably dark, which allows the user to visually recognize the video having a substantially uniform luminance. In addition, the video light replication unit 210 replicates the video light, to thereby be able to expand the eye box, which is a range that allows the user's eyes to visually recognize the video.

As described above, when the distance by which the video light is propagated inside the pupil expanding prism 303 becomes longer, at least a part of the video light 410 is displaced in the positive z-axis direction or the negative z-axis direction, to thereby be prevented from entering the entrance surface 11 of the light guide plate 801. According to the fifth embodiment, at least one or both of a distance from the first partially reflecting surface 314A to the N-th partially reflecting surface 315A and a distance from the first partially reflecting surface 314B to the M-th partially reflecting surface 320B can be shortened, and hence it is possible to reduce the displacement of the video light 410 in the positive z-axis direction or the negative z-axis direction. With this configuration, it is possible to enhance the light utilization efficiency of the video light. In addition, the light utilization efficiency of the video light 410 corresponding to the angles of view (positions of pixels in an image) at the four corners or four sides of the video can be particularly enhanced, and hence it is possible to achieve more uniform luminance of the video to be visually recognized by the user.

Sixth Embodiment

In a sixth embodiment of this invention, the video light replication unit 210 includes a pupil expanding beam splitter 321. In the sixth embodiment, the same components as those of the above-mentioned embodiments are denoted by the same reference symbols, and their descriptions are omitted below.

Figure 22:
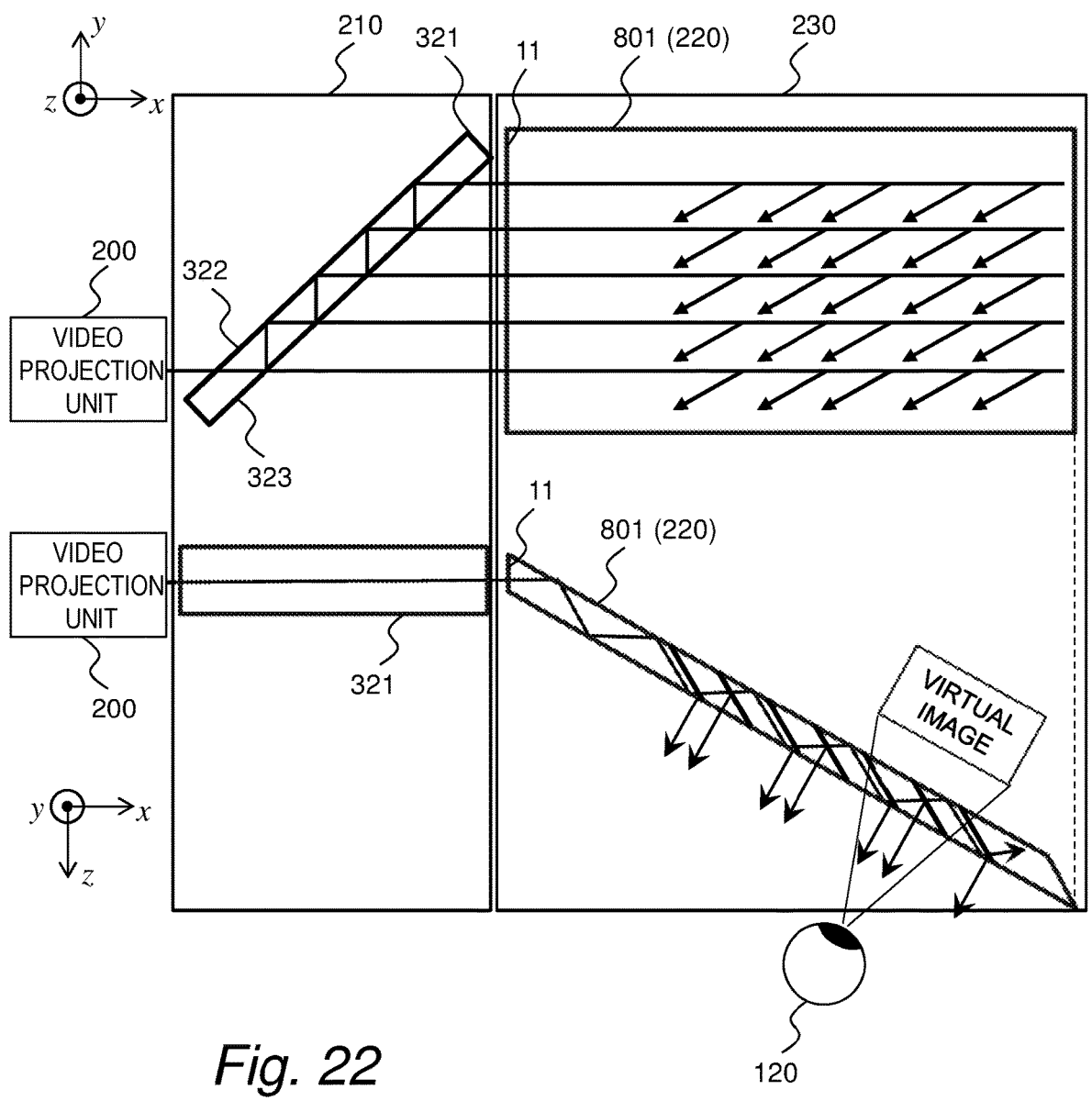
FIG. 22 is a diagram for illustrating a configuration example of a video display apparatus according to a sixth embodiment.

FIG. 22 is a diagram for illustrating an example of the video display apparatus 101 according to the sixth embodiment. The video light replication unit 210 in the sixth embodiment includes the pupil expanding beam splitter 321. The pupil expanding beam splitter 321 includes an entrance surface 322 and an exit surface 323. An angle formed by the exit surface 323 of the pupil expanding beam splitter 321 and the entrance surface 11 of the light guide plate 801 is larger than 0 degrees.

The video light generated by the video projection unit 200 enters the pupil expanding beam splitter 321 through the entrance surface 322. The pupil expanding beam splitter 321 is formed of transparent glass or resin, and at least a part of the video light that has entered the pupil expanding beam splitter 321 is propagated through the inside of the pupil expanding beam splitter 321. The video light that has been propagated through the inside of the pupil expanding beam splitter 321 reaches the exit surface 323. The exit surface 323 is configured to transmit at least a part of the light and reflect at least a part of the light. The light transmitted through the exit surface 323 exits the pupil expanding beam splitter 321. The light reflected by the exit surface 323 is transmitted through the inside of the pupil expanding beam splitter 321 to reach the entrance surface 322, and is reflected by the entrance surface 322 to reach the exit surface 323 again. Each time the light that has entered the entrance surface 322 reaches the exit surface 323, a part of the video light exits the exit surface 323.

The pupil expanding beam splitter 321 is configured such that the entrance surface 322 and the exit surface 323 of the pupil expanding beam splitter 321 are substantially parallel to each other. With this configuration, the pupil expanding beam splitter 321 can output a plurality of (at least two) video light beams having substantially the same angle of view (size of the video expressed by an angle) as the video light entering the pupil expanding beam splitter 321.

Preferably, the transmittance of the entrance surface 322 in a region to be entered by the video light generated by the video projection unit 200 may be approximately 1. With this configuration, it is possible to enhance the light utilization efficiency. It is also preferred that the reflectance of the entrance surface 322 in a region to be reached by the video light reflected by the exit surface 323 be approximately 1. With this configuration, it is possible to enhance the light utilization efficiency.

A region within an exit surface to be reached by the video light that has entered through the entrance surface 322 is defined as a first arrival region, and assuming that k is an integer equal to or larger than 1, a region within an exit surface to be reached again by the video light reflected by a k-th arrival region and reflected by the entrance surface 322 is defined as a (k+1)th arrival region in order. Assuming that N is an integer equal to or larger than 2, the exit surface 323 includes the first arrival region to an N-th arrival region, and the pupil expanding beam splitter 321 outputs N video light beams.

Assuming that k is an integer equal to or larger than 1 and equal to or smaller than N−1, a distance between the k-th arrival region and the (k+1)th arrival region is defined as a displacement amount LCk in the y-axis direction between the respective centers of the k-th arrival region and the (k+1)th arrival region. The center of the region is, for example, the center of gravity of the region. According to another aspect of this invention, the center of the region is a point to be reached by the principal ray among the video rays output from the video projection unit 200 at the angle of view (position of a pixel in an image) at the center of the video. Of the optical elements included in the video projection unit 200, the optical element that reflects, transmits, or refracts the video light immediately before the video light is emitted from the video projection unit 200 is referred to as "final optical element". At this time, the video projection unit 200 and the video light replication unit 210 are configured such that at least one of the distances LCk between two adjacent arrival regions is smaller than or substantially equal to the outer size of the final optical element.

With this configuration, at least parts of the plurality of video light beams that have exited the video light replication unit 210 are overlapped with each other, and hence a part of the video to be visually recognized by the user is prevented from becoming considerably dark, which allows the user to visually recognize the video having a substantially uniform luminance. In addition, the video light replication unit 210 replicates the video light, to thereby be able to expand the eye box, which is a range that allows the user's eyes to visually recognize the video.

The reflectance of the k-th arrival region may be set larger than the reflectance of the (k+1)th arrival region. Preferably, the reflectance of the k-th arrival region may be set as (N−k)÷N. With this configuration, the intensities of a plurality of video light beams output from the pupil expanding beam splitter 321 are substantially equal to each other, and hence it is possible to achieve further uniform luminance of the video to be visually recognized by the user.

According to another aspect of this invention, one or both of the entrance surface 322 and the exit surface 323 may be configured to exhibit a substantially uniform reflectance over each entire surface. With this configuration, it is possible to reduce the cost of the pupil expanding beam splitter 321.

According to the sixth embodiment, it is possible to simplify the configuration of the video light replication unit 210, to thereby reduce the cost.

Seventh Embodiment

In a seventh embodiment of this invention, the video light replication unit 210 includes a plurality of pupil expanding prisms 300A and 300B.

Figure 24:
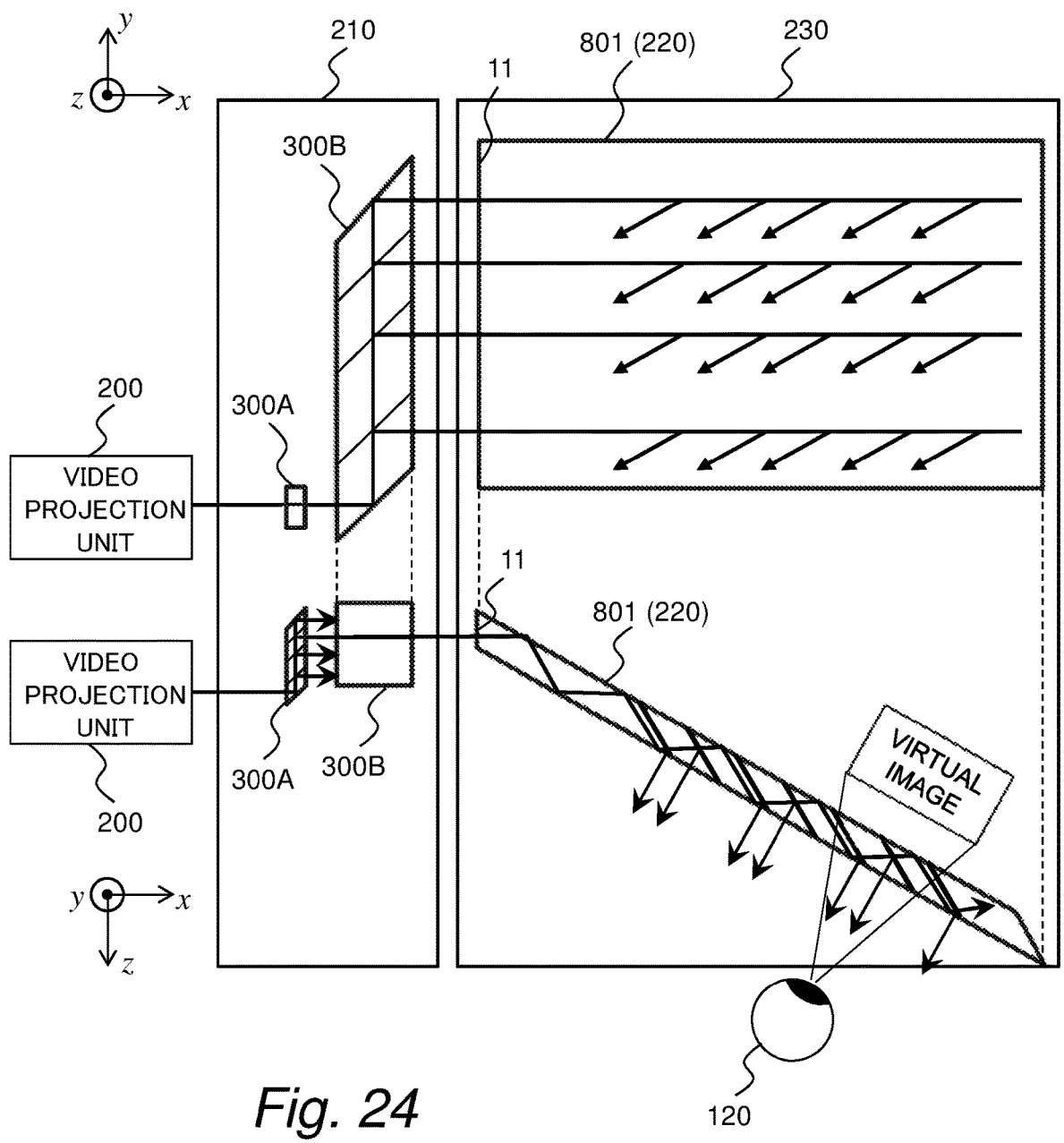
FIG. 24 is a diagram for illustrating a configuration example of a video display apparatus according to a seventh embodiment.

FIG. 24 is a diagram for illustrating an example of the video display apparatus 101 according to the seventh embodiment. The video light replication unit 210 in the seventh embodiment includes the first pupil expanding prism 300A and the second pupil expanding prism 300B.

A direction in which the first pupil expanding prism 300A replicates the rays and a direction in which the second pupil expanding prism 300B replicates the rays may be different. For example, as illustrated in FIG. 24, in the video display apparatus 101, the first pupil expanding prism 300A replicates the rays in the z-axis direction, and the second pupil expanding prism 300B replicates the rays in the y-axis direction.

According to the seventh embodiment, the light flux of the video light output from the video projection unit 200 is replicated into two-dimensional directions, and hence it is possible to further reduce the luminance unevenness of the video to be visually recognized by the user.

As described above, a video display apparatus according to at least one embodiment of this invention includes: the video projection unit 200 configured to project video light; the video light replication unit 210 configured to replicate the video light; and the light guiding unit 230 configured to transmit the video light through its inside, in which: the video light replication unit 210 is configured to transmit the video light emitted from the video projection unit 200 to the light guiding unit 230; the light guiding unit 230 is configured to transmit the video light that has entered through the inside to output the video light; and the video light replication unit 210 is configured to replicate the video light that has entered the video light replication unit 210 so that the luminance distribution of the video light output from the light guiding unit 230 is uniform (for example, in the luminance distribution of the video to be visually recognized by the user, a ratio of the local minimum value to the local maximum value of adjacent luminances is equal to or larger than ½). Therefore, it is possible to provide a wide eye box, and to display a video having uniform luminance.

Further, the video light replication unit 210 includes at least two partially reflecting surfaces 320, which are substantially parallel to each other, and are each configured to reflect at least a part of light, and the video light replication unit 210 is configured to replicate the video light that has entered to output at least two video light beams, and at least one of the distances between the adjacent partially reflecting surfaces 320 is smaller than or equal to the outer size of the final optical element (final lens 332 of the projection optical unit 330) that reflects, transmits, or refracts the video light immediately before the video light is emitted from the video projection unit 200. Therefore, at least parts of the video light beams output from the respective partially reflecting surfaces are overlapped with each other, and hence a part of the video to be visually recognized by the user is prevented from becoming considerably dark, which allows the user to visually recognize the video having substantially uniform luminance.

Further, the partially reflecting surfaces 320 are arranged so that the video light enters at least one position of the first partially reflecting surface 314 to the (N−1)th partially reflecting surface 320 by which the video light is first reflected, and exits at least two positions of the second partially reflecting surface 320 to the N-th partially reflecting surface 315. Therefore, the respective reflectances of the entrance surface 310 and the exit surface 311 can be controlled to display the video with further uniform luminance.

Further, the partially reflecting surfaces 320 are arranged so that the video light is reflected by or transmitted through the first partially reflecting surface 314 before being reflected by or transmitted through the second partially reflecting surface 320. Therefore, it is possible to facilitate manufacture of the pupil expanding prism 300 of the video light replication unit 210, to thereby reduce the cost.

Further, the partially reflecting surfaces 320 are arranged so that at least a part of the video light is reflected by or transmitted through the second partially reflecting surface 320 without being reflected by or transmitted through the first partially reflecting surface 314. Therefore, it is possible to downsize the pupil expanding prism 301 of the video light replication unit 210.

Further, at least one of distances between the k-th partially reflecting surface 320 and the (k+1)th partially reflecting surface 320 is set smaller than a distance between the (k−1)th partially reflecting surface 320 and the k-th partially reflecting surface 320. Therefore, some of the distances between the partially reflecting surfaces 320 may be the same, which allows the pupil expanding prism 300 of the video light replication unit 210 to be manufactured with a low cost.

Further, every distance between the k-th partially reflecting surface 320 and the (k+1)th partially reflecting surface 320 is set smaller than the distance between the (k−1)th partially reflecting surface 320 and the k-th partially reflecting surface 320. Therefore, the distances between the partially reflecting surfaces 320 become gradually narrower, and the performance of the pupil expanding prism 300 of the video light replication unit 210 increases, to thereby be able to output the video with further uniform luminance.

Further, at least one reflectance of the m-th partially reflecting surface 320 is set smaller than a reflectance of the (m+1)th partially reflecting surface. Therefore, some of the reflectances of the partially reflecting surfaces 320 may be the same, which allows the pupil expanding prism 300 of the video light replication unit 210 to be manufactured with a low cost.

Further, every reflectance of the m-th partially reflecting surfaces 320 is set smaller than the reflectance of the (m+1)th partially reflecting surface 320. Therefore, the reflectances of the partially reflecting surfaces 320 become gradually larger, and the performance of the pupil expanding prism 300 of the video light replication unit 210 increases, to thereby be able to output the video with further uniform luminance.

Further, the distance from the final optical element (final lens 332) to the exit pupil of the projection lens (projection optical unit 330) is set longer than the distance from the final optical element (final lens 332) to an entrance surface through which the video light is to enter the video light replication unit 210. Therefore, it is easy for light to enter human eyes, to thereby be able to output the video with further uniform luminance.

Further, the light guiding unit 230 (light guide plate 220) includes: the optical input portion 221 from which the video light output from the video light replication unit 210 is to be input; the plurality of beam splitter surfaces 17, which are provided substantially in parallel to each other, and are each configured to reflect at least a part of the light and transmit at least a part of the light; and the optical output portion 222 from which the video light transmitted through the inside is to be output, in which: the optical output portion 222 is provided to any one of the surfaces 223 and 224 of the light guiding unit 230 (light guide plate 220) by which the video light is totally reflected. Therefore, it is possible to display an image having color unevenness smaller than in the case of using a diffraction grating for the light guiding unit 230.

Further, the video display system 100 according to at least one embodiment of this invention includes: the video display apparatus 101 described above; and the image signal processing module 104 configured to generate a projection video signal to be used by the video projection unit 200 to project video light. Therefore, it is possible to provide a wide eye box, and to display a video having uniform luminance and/or uniform colors.

Further, the image signal processing module 104 is configured to output an image converted so as to compensate for the optical characteristic of at least one of the video light replication unit 210 or the light guiding unit 230. Therefore, it is possible to display an image having uniform luminance and/or uniform colors.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A video display apparatus comprising:
a video projection unit configured to project video light;
a video light replication unit configured to replicate the video light; and
a light guiding unit configured to transmit the video light through an inside of the light guiding unit,
wherein the video light replication unit is configured to transmit the video light emitted from the video projection unit to the light guiding unit,
wherein the light guiding unit is configured to transmit the video light that has entered through the inside to output the video light, and
wherein the video light replication unit is configured to replicate the video light that has entered the video light replication unit so that a luminance distribution of the video light output from the light guiding unit is uniform.

2. The video display apparatus according to claim 1,
wherein the video light replication unit includes at least two partially reflecting surfaces, which are substantially parallel to each other, and are each configured to reflect at least a part of light,
wherein the video light replication unit is configured to replicate the video light that has entered to output at least two video light beams, and
wherein at least one of distances between the adjacent partially reflecting surfaces is smaller than or equal to an outer size of a final optical element at which the video light is subjected to one of reflection, transmission, and refraction immediately before being emitted from the video projection unit.

3. The video display apparatus according to claim 2, wherein the video projection unit includes a projection lens including the final optical element.

4. The video display apparatus according to claim 3, wherein at least one of the distances between the adjacent partially reflecting surfaces is smaller than or equal to an exit pupil diameter of the projection lens.

5. The video display apparatus according to claim 2,
wherein, assuming that N represents an integer equal to or larger than 2, a number of the at least two partially reflecting surfaces is set as N,
wherein one of the at least two partially reflecting surfaces on which the video light is finally subjected to one of reflection and transmission is set as an N-th partially reflecting surface, wherein the at least two partially reflecting surfaces are set as a first partially reflecting surface to an (N−1)th partially reflecting surface in descending order of a distance from the N-th partially reflecting surface, and wherein the at least two partially reflecting surfaces are arranged so that the video light enters at least one position of the first partially reflecting surface to the (N−1)th partially reflecting surface by which the video light is first reflected, and exits at least two positions of a second partially reflecting surface to the N-th partially reflecting surface.

6. The video display apparatus according to claim 5, wherein the at least two partially reflecting surfaces are arranged so that the video light is subjected to one of reflection and transmission on the first partially reflecting surface before being subjected to one of reflection and transmission on the second partially reflecting surface.

7. The video display apparatus according to claim 5, wherein the at least two partially reflecting surfaces are arranged so that at least a part of the video light is subjected to one of reflection and transmission on the second partially reflecting surface without being subjected to reflection and transmission on the first partially reflecting surface.

8. The video display apparatus according to claim 5, wherein, assuming that k is an integer equal to or larger than 2 and smaller than N, at least one of distances between a k-th partially reflecting surface and a (k+1)th partially reflecting surface of the at least two partially reflecting surfaces is smaller than a distance between a (k−1)th partially reflecting surface and the k-th partially reflecting surface of the at least two partially reflecting surfaces.

9. The video display apparatus according to claim 8, wherein every distance between the k-th partially reflecting surface and the (k+1)th partially reflecting surface is smaller than the distance between the (k−1)th partially reflecting surface and the k-th partially reflecting surface.

10. The video display apparatus according to claim 2, wherein, assuming that N represents an integer equal to or larger than 2, a number of the at least two partially reflecting surfaces is set as N, wherein one of the at least two partially reflecting surfaces on which the video light is finally subjected to one of reflection and transmission is set as an N-th partially reflecting surface, wherein the at least two partially reflecting surfaces are set as a first partially reflecting surface to an (N−1)th partially reflecting surface in descending order of a distance from the N-th partially reflecting surface, and wherein, assuming that m is an integer equal to or larger than 2 and smaller than N, at least one reflectance of an m-th partially reflecting surface of the at least two partially reflecting surfaces is smaller than a reflectance of an (m+1)th partially reflecting surface of the at least two partially reflecting surfaces.

11. The video display apparatus according to claim 10, wherein every reflectance of the m-th partially reflecting surface is smaller than the reflectance of the (m+1)th partially reflecting surface.

12. The video display apparatus according to claim 3, wherein a distance from the final optical element to an exit pupil of the projection lens is longer than a distance from the final optical element to an entrance surface through which the video light is to enter the video light replication unit.

13. The video display apparatus according to claim 2, wherein the light guiding unit comprises:
   an optical input portion, from which the video light output from the video light replication unit is to be input;
   a plurality of beam splitter surfaces, which are provided substantially in parallel to each other, and are each configured to reflect at least a part of light and transmit at least a part of the light; and
   an optical output portion, from which the video light transmitted through the inside of the light guiding unit is to be output,
   wherein the optical output portion is provided to any one of surfaces of the light guiding unit by which the video light is totally reflected.

14. A video display system, comprising:
   the video display apparatus of claim 1; and
   an image signal processing module configured to generate a projection video signal to be used by the video projection unit to project video light.

15. The video display system according to claim 14, wherein the image signal processing module is configured to output an image converted so as to compensate for an optical characteristic of at least one of a video light replication unit or a light guiding unit.

* * * * *